US012585448B2

(12) United States Patent
Ji et al.

(10) Patent No.: US 12,585,448 B2
(45) Date of Patent: Mar. 24, 2026

(54) PRIORITIZED APPLICATION UPDATES

(71) Applicant: Google LLC, Mountain View, CA (US)

(72) Inventors: Haifeng Ji, San Jose, CA (US); Zhiwei Gu, San Jose, CA (US); Jing Zhao, Palo Alto, CA (US); Vitor Baccetti Garcia, San Francisco, CA (US); Alexey Semenov, San Jose, CA (US); Apeksha Singhal, Cupertino, CA (US); Scott Williams, Mountain View, CA (US); Yudi Wu, Chongqing (CN); Jiahui Liu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 18/043,634

(22) PCT Filed: Jul. 13, 2021

(86) PCT No.: PCT/US2021/041434
§ 371 (c)(1),
(2) Date: Mar. 1, 2023

(87) PCT Pub. No.: WO2022/108628
PCT Pub. Date: May 27, 2022

(65) Prior Publication Data
US 2023/0376297 A1     Nov. 23, 2023

Related U.S. Application Data

(60) Provisional application No. 63/116,709, filed on Nov. 20, 2020.

(51) Int. Cl.
*G06F 8/65* (2018.01)
*G06F 9/48* (2006.01)
*G06N 20/00* (2019.01)

(52) U.S. Cl.
CPC .............. *G06F 8/65* (2013.01); *G06F 9/4881* (2013.01); *G06N 20/00* (2019.01)

(58) Field of Classification Search
CPC .......... G06F 8/65; G06F 9/4881; G06N 20/00
See application file for complete search history.

(56) References Cited

U.S. PATENT DOCUMENTS 9,727,326 B2 * 8/2017 Ciudad ...................... G06F 8/65
10,630,804 B1 * 4/2020 Thiagrajan ............ G06F 9/4881
(Continued)

FOREIGN PATENT DOCUMENTS

| CN | 107480165 A | 12/2017 |
| CN | 111638892 A | 9/2020 |
| WO | 2022108628 A1 | 5/2022 |

OTHER PUBLICATIONS

Glick, "Modern app and game distribution on Google Play", Android Developers Blog, Nov. 7, 2019, p. 4.
(Continued)

*Primary Examiner* — Hanh Thi-Minh Bui
(74) *Attorney, Agent, or Firm* — Shumaker & Sieffert, P.A.

(57) ABSTRACT

A computing system may receive a request for application update information for one or more applications installed on a computing device. The computing system determines, based on the request for the application update information, a set of applications that need to be updated and applies a machine learning model to determine a respective update priority score for each application from the set of applications. The computing system sends an indication of the respective update priority scores for the set of applications to the computing device. Responsive to receiving an update request from the computing device, the computing system
(Continued)

RECEIVE REQUEST FROM CLIENT DEVICE FOR APPLICATION UPDATE INFORMATION ⟋500

DETERMINE SET OF APPLICATIONS THAT NEED TO BE UPDATED ⟋502

APPLY MACHINE LEARNING TO DETERMINE UPDATE PRIORITY SCORE(S) FOR SET OF APPLICATIONS ⟋504

SEND AN INDICATION OF UPDATE PRIORITY SCORE(S) TO CLIENT DEVICE ⟋506

RECEIVE UPDATE REQUEST BASED ON UPDATE PRIORITY SCORE(S) FROM CLIENT DEVICE ⟋508

INITIATE INSTALLATION OF UPDATE(S) BASED ON UPDATE PRIORITY SCORE(S) ⟋510 initiates installation of the pending update for the at least one application from the set of applications.

11 Claims, 7 Drawing Sheets

(56)                    References Cited

U.S. PATENT DOCUMENTS

| | | |
|---|---|---|
| 2014/0366041 A1 | 12/2014 | Stanley-Marbell et al. |
| 2016/0266890 A1 | 9/2016 | Aleksandrov et al. |
| 2017/0010883 A1 | 1/2017 | Alsina et al. |
| 2018/0302494 A1 | 10/2018 | Jain et al. |
| 2019/0303118 A1 | 10/2019 | Avinash et al. |
| 2020/0019393 A1 | 1/2020 | Vichare et al. |
| 2020/0117443 A1 | 4/2020 | Nandakumar et al. |
| 2020/0371774 A1 | 11/2020 | Kato et al. |
| 2022/0391187 A1 | 12/2022 | Brooks et al. |

OTHER PUBLICATIONS

Rahman et al., "Internet data budget allocation policies for diverse smartphone applications", retrieved from: https://wcn-eurasipjournals.springeropen.com/articles/10.1186/s13638-016-0727-9, Sep. 22, 2016, 44 pp.

Sn24team, "Google Play Store latest update allow automatic updates over limited mobile data", retrieved from: https://www.samnews24.com/2022/11/14/google-play-store-update-november-14-2022/, Nov. 14, 2022, 5 pp.

Vartianinen et al., "Auto-update: a concept for automatic downloading of web content to a mobile device", Sep. 2007, 8 pp.

Invitation to Pay Additional Fees and, Where Applicable, Protest Fee from International Application No. PCT/US2021/041434, dated Oct. 28, 2021, 10 pp.

International Search Report and Written Opinion of International Application No. PCT/US2023/062154 dated Aug. 10, 2023, 11 pp.

International Preliminary Report on Patentability from International Application No. PCT/US2021/041434 dated Jun. 1, 2023, 13 pp.

International Search Report and Written Opinion of International Application No. PCT/US2021/041434 dated Dec. 21, 2021, 18 pp.

Response to Communication Pursuant to Rules 161(1) and 162 EPC dated Jun. 27, 2023, from counterpart European Application No. 21752320.8, filed Jan. 5, 2024, 22 pp.

Communication pursuant to Article 94(3) EPC from counterpart European Application No. 21752320.8 dated Feb. 29, 2024, 3 pp.

Response to Communication pursuant to Article 94(3) EPC dated Feb. 29, 2024, from counterpart European Application No. 21752320.8 filed May 23, 2024, 12 pp.

Communication pursuant to Article 94(3) EPC from counterpart European Application No. 21752320.8 dated Dec. 18, 2024, 4 pp.

Notice of Intent to Grant and Text Intended to Grant from counterpart European Application No. 21752320.8 dated Jul. 23, 2025, 58 pp.

Response to Extended Search Report dated Dec. 18, 2024, from counterpart European Application No. 21752320.8 filed Apr. 3, 2025, 2 pp.

First Examination Report from counterpart Indian Application No. 202347024511 dated Oct. 8, 2025, 9 pp.

Response to Office Action dated Oct. 8, 2025, from counterpart Indian Application No. 202347024511 filed Feb. 10, 2026, 31 pp.

* cited by examiner

450

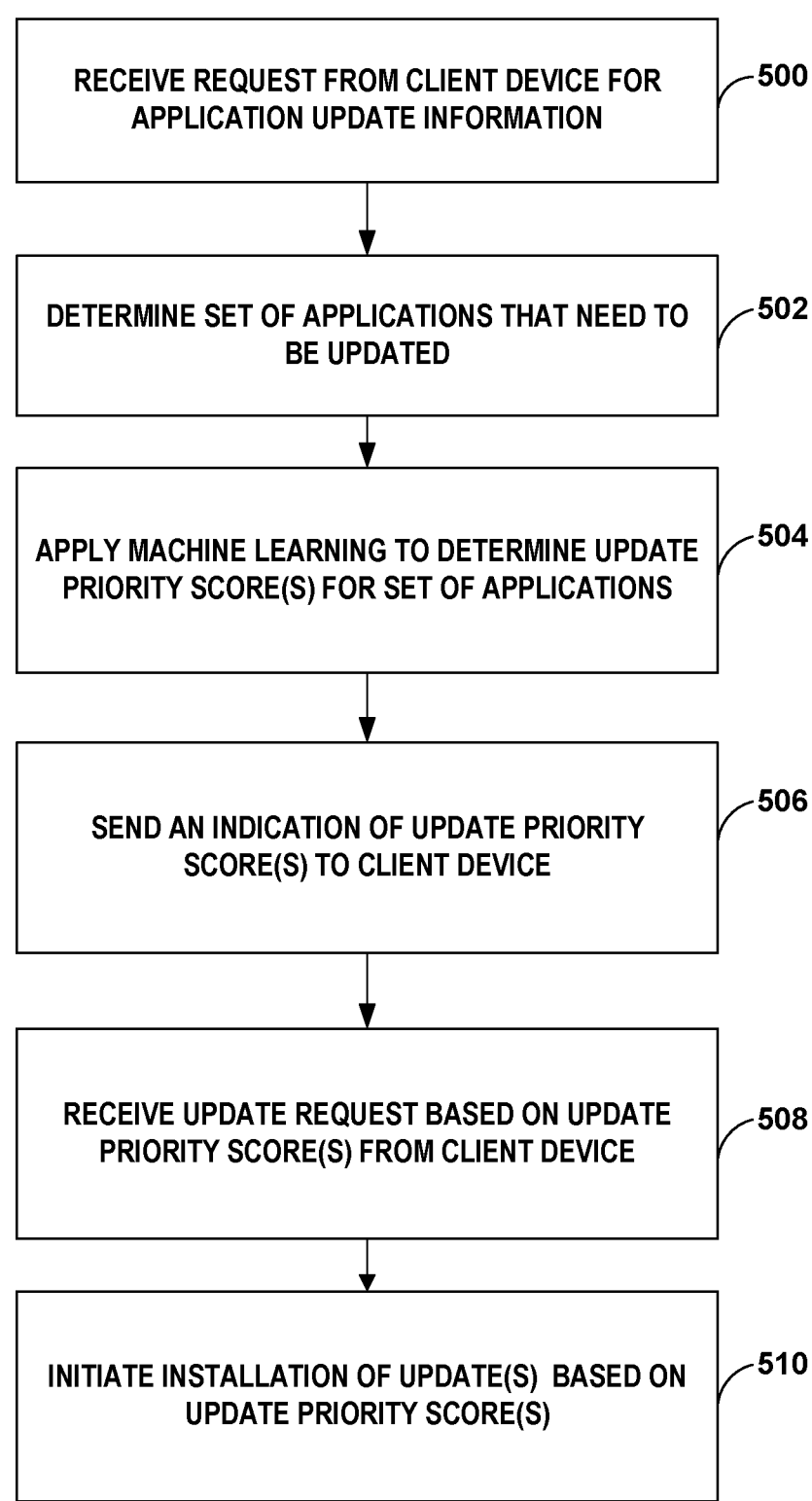

RECEIVE REQUEST FROM CLIENT DEVICE FOR APPLICATION UPDATE INFORMATION — 500

DETERMINE SET OF APPLICATIONS THAT NEED TO BE UPDATED — 502

APPLY MACHINE LEARNING TO DETERMINE UPDATE PRIORITY SCORE(S) FOR SET OF APPLICATIONS — 504

SEND AN INDICATION OF UPDATE PRIORITY SCORE(S) TO CLIENT DEVICE — 506

RECEIVE UPDATE REQUEST BASED ON UPDATE PRIORITY SCORE(S) FROM CLIENT DEVICE — 508

INITIATE INSTALLATION OF UPDATE(S) BASED ON UPDATE PRIORITY SCORE(S) — 510

FIG. 5

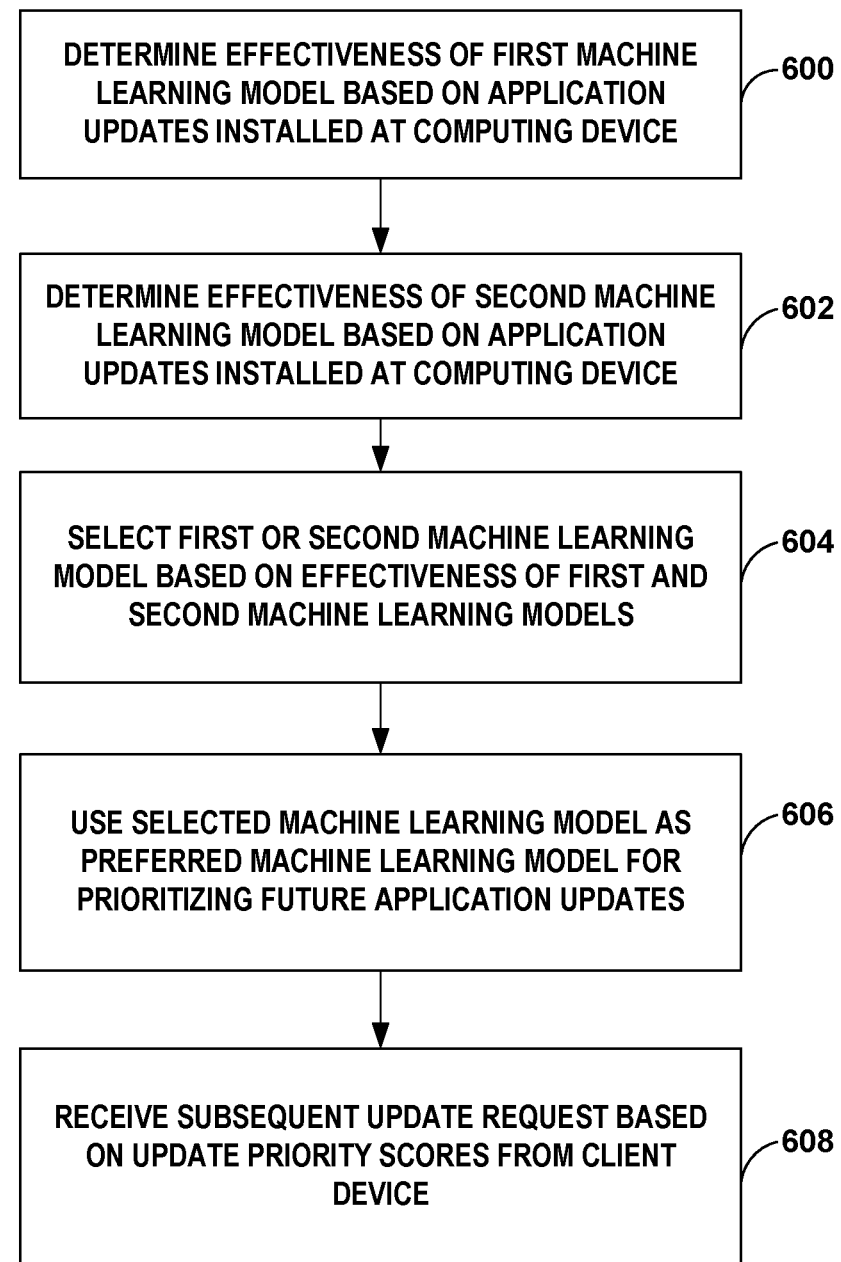

DETERMINE EFFECTIVENESS OF FIRST MACHINE LEARNING MODEL BASED ON APPLICATION UPDATES INSTALLED AT COMPUTING DEVICE ⟋600

DETERMINE EFFECTIVENESS OF SECOND MACHINE LEARNING MODEL BASED ON APPLICATION UPDATES INSTALLED AT COMPUTING DEVICE ⟋602

SELECT FIRST OR SECOND MACHINE LEARNING MODEL BASED ON EFFECTIVENESS OF FIRST AND SECOND MACHINE LEARNING MODELS ⟋604

USE SELECTED MACHINE LEARNING MODEL AS PREFERRED MACHINE LEARNING MODEL FOR PRIORITIZING FUTURE APPLICATION UPDATES ⟋606

RECEIVE SUBSEQUENT UPDATE REQUEST BASED ON UPDATE PRIORITY SCORES FROM CLIENT DEVICE ⟋608

FIG. 6

PRIORITIZED APPLICATION UPDATES

BACKGROUND

Computing devices such as the mobile phone have proliferated in recent years. These devices may be equipped
with processors, memory, and the capability to communicate
through local and wide area networks, including the Internet.
These devices may be equipped with operating systems
which permit the devices to execute a wide range of computer programs and software applications, typically called
"apps." The user of a computing device may download and
install applications by direct communication with a com-
puting system (e.g., a server hosting an application store)
through a cellular network or wireless local area network.
Developers of these applications regularly update the appli-
cations and push the updated version of the application to the
computing system to make the updated version of the
application available for installation by the computing
devices. However, due to the number of application updates
that may need to be installed, managing application updates
may be difficult for a user.

SUMMARY

Techniques are described by which a computing system
and computing device may operate to prioritize the instal-
lation of updates for a set of applications installed on the
computing device. In general, users of the computing
devices may manage application updates by manually downloading the application updates or electing to have the
application updates automatically pushed to the computing
devices as soon as the application updates become available
("auto-updates"). While auto-updates facilitate installation
of application updates without user interaction from the user,
auto-updates that treat all applications equally in terms of
update prioritization may, for various reasons, result in
applications that are not relatively important to the user
being updated (e.g., a successful installation) and applica-
tions that are relatively important not being updated (e.g., an
unsuccessful installation).

Rather than automatically installing application updates
without assessing application update prioritization, tech-
niques of this disclosure enable the computing device to
identify application updates that have a higher likelihood of
successful installation while also prioritizing updates for
applications the user uses most frequently. In general, a
computing device and/or a cloud computing system may
apply a machine learning model to one or more of an
application usage history, application update installation
history, network settings for auto-updates, and the like to
determine update priority scores for a set of application
updates. The computing device and/or cloud computing
system may prioritize (e.g., rank) the application updates
based on the update priority scores for the set of applications. Using this application update ranking, the computing
device may prioritize downloading and installing at least one
of the highest ranked application updates.

In this way, various aspects of the techniques may enable
the computing device to identify application updates that
have a higher likelihood to be successfully installed and that
are of greater importance to the user. By prioritizing updates
in this manner, the number of failed application update
installs may be reduced, which may reduce bandwidth,
processor, and power usage of the device. Further, by
prioritizing application updates for those applications in
which the user of the computing device is most interested and/or more frequently uses, application updates for rela-
tively unimportant applications may not be downloaded or
downloaded less frequently (e.g., due to being of lower
priority) which may also reduce bandwidth usage (e.g., by
not downloading undesirable application updates) and
reduce CPU usage (e.g., by prioritizing updates more likely
to be successfully installed, resulting in fewer failed instal-
lations). Moreover, prioritizing updates for applications the
user uses frequently may aid in reducing crashes or other
bugs in such applications.

In some examples, a method includes receiving, by a
computing system and from a computing device, a request
for application update information for one or more applica-
tions installed on the computing device, determining, by the
computing system and based on the request for the appli-
cation update information, a set of applications that need to
be updated, where each application from the set of applica-
tions is associated with a respective pending update, and
applying, by the computing system, a machine learning
model to determine a respective update priority score for
each application from the set of applications. The method
may further include sending, from the computing system
and to the computing device, an indication of the respective
update priority scores for the set of applications, receiving,
by the computing system and from the computing device, an
update request for at least one application from the set of
applications, the at least one application from the set of
applications being selected by the computing device based
on the respective update priority scores, and, responsive to
receiving the update request, initiating, by the computing
system, installation of the pending update for the at least one
application from the set of applications.

In some examples, a computing system includes a
memory and one or more processors. The one or more
processors may be configured to receive, from a computing
device, a request for application update information for one
or more applications installed on the computing device,
determine, based on the request for the application update
information, a set of applications that need to be updated,
where each application from the set of applications is
associated with a respective pending update, and apply a
machine learning model to determine a respective update
priority score for each application from the set of applica-
tions. The one or more processors may be further configured
to send, to the computing device, an indication of the
respective update priority scores for the set of applications,
receive, from the computing device, an update request for at
least one application from the set of applications, the at least
one application from the set of applications being selected
by the computing device based on the respective update
priority scores, and, responsive to receiving the update
request, initiate installation of the pending update for the at
least one application from the set of applications.

In some examples, a non-transitory computer-readable
storage medium encoded with instructions that, when
executed by one or more processors of a computing system,
cause the one or more processors to receive, from a com-
puting device, a request for application update information
for one or more applications installed on the computing
device, determine, based on the request for the application
update information, a set of applications that need to be
updated, where each application from the set of applications
is associated with a respective pending update, and apply a
machine learning model to determine a respective update
priority score for each application from the set of applica-
tions. The instructions may further cause the one or more
processors to send, to the computing device, an indication of the respective update priority scores for the set of applications, receive, from the computing device, an update request for at least one application from the set of applications, the at least one application from the set of applications being selected by the computing device based on the respective update priority scores, and, responsive to receiving the update request, initiate installation of the pending update for the at least one application from the set of applications.

In some examples, a method includes sending, by a computing device and to a computing system, a request for application update information for one or more applications installed on the computing device, receiving, by the computing device and from the computing system, an indication of a respective update priority score for each application from the set of applications having a corresponding pending update, wherein each respective update priority score is determined by the computing system by at least applying a machine learned model to each application of the set of applications having the corresponding pending update, and selecting, by the computing device and based on the respective update priority rankings, at least one corresponding pending update to request from the computing system. The method may also include sending, by the computing device and to the computing system, an update request for the at least one corresponding pending update, and, responsive to receiving, by the computing device and from the computing system, the at least one corresponding pending update, installing, by the computing device, the at least one corresponding pending update.

In some examples, a device includes means for sending, to a computing system, a request for application update information for one or more applications installed on the computing device, means for receiving, from the computing system, an indication of a respective update priority score for each application from the set of applications having a corresponding pending update, wherein each respective update priority score is determined by the computing system by at least applying a machine learned model to each application of the set of applications having the corresponding pending update, and means for selecting, based on the respective update priority rankings, at least one corresponding pending update to request from the computing system. The device may also include means for sending, to the computing system, an update request for the at least one corresponding pending update, and, responsive to receiving, from the computing system, the at least one corresponding pending update, means for installing at least one corresponding pending update.

In some examples, a method includes determining, by a computing system, an effectiveness of a first machine learning model based on a set of application updates installed on a first computing device that were prioritized based on a respective first update priority score for each application generated by the first machine learning model, determining, by the computing system, an effectiveness of a second machine learning model based on a set of application updates installed on a second computing device that were prioritized based on a respective second update priority score for each application generated by the second machine learning model, and selecting, by the computing system and based on the effectiveness of the first machine learning model and the effectiveness of the second machine learning model, a more effective one of the first and second machine learning models to use for prioritizing future application updates as a preferred machine learning model.

In some examples, a computing device includes a memory that stores one or more modules and one or more processors. The one or more processors execute the one or more modules to determine an effectiveness of a first machine learning model based on a set of application updates installed on a first computing device that were prioritized based on a respective first update priority score for each application generated by the first machine learning model, determine an effectiveness of a second machine learning model based on a set of application updates installed on a second computing device that were prioritized based on a respective second update priority score for each application generated by the second machine learning model, and select, based on the effectiveness of the first machine learning model and the effectiveness of the second machine learning model, a more effective one of the first and second machine learning models to use for prioritizing future application updates as a preferred machine learning model.

In some examples, a non-transitory computer-readable storage medium encoded with instructions that, when executed by one or more processors of a computing system, cause the one or more processors to determine an effectiveness of a first machine learning model based on a set of application updates installed on a first computing device that were prioritized based on a respective first update priority score for each application generated by the first machine learning model, determine an effectiveness of a second machine learning model based on a set of application updates installed on a second computing device that were prioritized based on a respective second update priority score for each application generated by the second machine learning model, and select, based on the effectiveness of the first machine learning model and the effectiveness of the second machine learning model, a more effective one of the first and second machine learning models to use for prioritizing future application updates as a preferred machine learning model.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 5 is a flowchart illustrating an exemplary operation of the computing system and computing device in accordance with techniques of this disclosure.

FIG. 6 is a flowchart illustrating another exemplary operation of the computing system and computing device in accordance with techniques of this disclosure.

DETAILED DESCRIPTION

Figure 1:
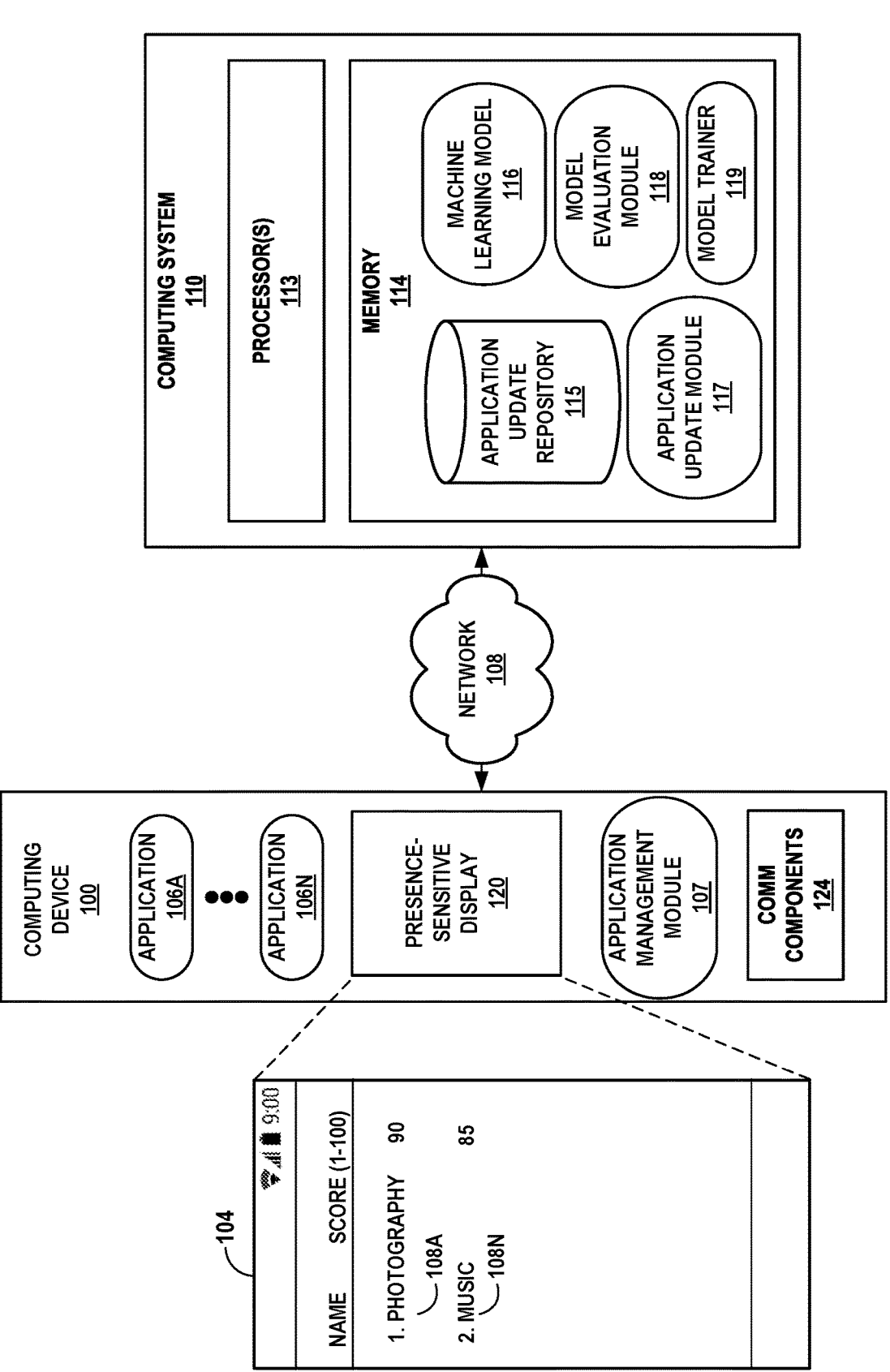
FIG. 1 is a conceptual diagram illustrating an example computing system and computing device for prioritizing application updates in accordance with techniques of this disclosure.

FIG. 1 is a conceptual diagram illustrating an example computing system and computing device for prioritizing application updates in accordance with techniques of this disclosure. As shown in the example of FIG. 1, a computing device 100 and a computing system 110 may facilitate management of application updates by prioritizing the installation of updates for a set of applications installed on the computing device 100 in accordance with one or more techniques of this disclosure.

In the example of FIG. 1, computing device 100 is a mobile computing device. However, computing device 100 may be any mobile or non-mobile computing device, such as a cellular phone, a smartphone, a personal digital assistant (PDA), a desktop computer, a laptop computer, a tablet computer, a portable gaming device, a portable media player, an e-book reader, a watch (including a so-called smartwatch), an add-on device (such as a casting device), smart glasses, a gaming controller, or another type of computing device.

Similarly, computing system 110 may be any suitable remote computing system, such as one or more desktop computers, laptop computers, mainframes, servers, cloud computing systems, virtual machines, etc. capable of sending and receiving information via network 108. In some examples, computing system 110 may represent a cloud computing system that provides one or more services via network 108. That is, in some examples, computing system 110 may be a distributed computing system. One or more computing devices, such as computing device 100, may access the services provided by the cloud by communicating with computing system 110. While described herein as being performed at least in part by computing system 110, any or all techniques of the present disclosure may be performed by one or more other devices, such as computing device 100. That is, in some examples, computing device 100 may be operable to perform one or more techniques of the present disclosure alone.

Computing device 100 may include application management module 107, presence-sensitive display 120, and communication ("COMM") components 124. Display 120 may be a presence-sensitive display that functions as an input device and as an output device. For example, the presence-sensitive display may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. The presence-sensitive display may function as an output (e.g., display) device using any of one or more display components, such as a liquid crystal display (LCD), dot matrix display, light emitting diode (LED) display, microLED display, organic light-emitting diode (OLED) display, e-ink, active matrix organic light-emitting diode (AMOLED) display, or similar monochrome or color display capable of outputting visible information to a user of computing device 100.

COMM components 124 may receive and transmit various types of information, such as information concerning pending updates associated with one or more applications 106 installed on computing device 100, over network 108. Network 108 may include a wide-area network such as the Internet, a local-area network (LAN), a personal area network (PAN) (e.g., Bluetooth®), an enterprise network, a wireless network, a cellular network, a telephony network, a Metropolitan area network (e.g., WIFI, WAN, WiMAX, etc.), one or more other types of networks, or a combination of two or more different types of networks (e.g., a combination of a cellular network and the Internet).

COMM components 124 may include wireless communication devices capable of transmitting and/or receiving communication signals using network 108, such as a cellular radio, a 3G radio, a 4G radio, a 5G radio, a Bluetooth® radio (or any other PAN radio), an NFC radio, or a WIFI radio (or any other WLAN radio). Additionally or alternatively, COMM components 124 may include wired communication devices capable of transmitting and/or receiving communication signals via a direct link over a wired communication medium (e.g., a universal serial bus ("USB") cable).

Computing device 100 may download, install, and execute one or more applications 106 (e.g., using one or more of COMM components 124). Applications 106A-N (collectively, "applications 106") may represent a first party application developed and provided as an application integrated into an operating system or a third-party application that a user of computing device 100 obtains via application store services provided by way of the operating system. Application 106 may extend software functionality of computing device 100, where application 106 may execute within an execution environment presented by the operating system. Application 106 may, as a few examples, provide gaming services (e.g., video games), email services, web browsing services, texting and/or chat services, web conferencing services, video conferencing services, music services (including streaming music services), video services (including video streaming services), navigation services, word processing services, spreadsheet services, slide and/or presentation services, assistant services, text entry services, or any other service commonly provided by applications.

According to techniques of this disclosure, computing device 100 may execute application management module 107 to facilitate management of application updates by operating in conjunction with an application update module 117 of computing system 110 to intelligently prioritize application updates. For example, computing device 100 may use application management module 107 to generate application management information for identifying applications 106 installed on computing device 100. In various instances, application management module 107 may be a client application associated with an application repository or store managed and/or provided by computing system 110. That is, computing device 100 may execute application management module 107 to present an online application store graphical user interface (e.g., GUI 104) via presence-sensitive display 120 for an online application store. The application store may be hosted or otherwise provided by computing system 110 and the application store may enable a user of computing device 100 to browse, search, select, purchase, download, and install various applications and application updates on computing device 100.

From time to time developers of various applications may add new features, fix various bugs, or otherwise update the software code for an application. The developer may publish the application update (e.g., for application 106A) to the online application store provided by computing system 110. When computing device 110 checks for any available updates for applications 106, computing system 110 may identify the published application update for application 106A as being a new update available for application 106A.

Computing device 100 may automatically send, using one or more COMM components 124, a request for application update information to computing system 110 (e.g., at a predefined schedule, based on application usage history, etc.) or may send such an application update information request in response to receiving a user input. The request for application update information may include information identifying computing device 100, information about one or more of applications 106, device storage information, user settings (e.g., auto-update settings) for application updates, and other configuration information for computing device 100. The information about applications 106 may include information such as a name or other text-based identifier, version information for the installed applications, historical application usage information for each installed application, results of previous application update attempts for the installed applications, etc.

As one example, application 106A installed on computing device 100 may be a photography application, and application 106N may be a music application. In such an example, application management module 107 may generate an application update request for photography application 106A and music application 106N. Application management module 107 may then send the application update request to computing system 110.

While examples are described where a computing device and/or a computing system analyzes information (e.g., application usage, device usage, installation histories, etc.) associated with a computing device and a user of a computing device, the computing device and/or computing system may analyze the information only if the computing device receives permission from the user of the computing device to analyze the information. For example, in situations discussed below, before a computing device or computing system may collect or may make use of information associated with a user, the user may be provided with an opportunity to provide input to control whether programs or features of the computing device and/or computing system may collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally identifiable information is removed. Thus, the user may have control over how information is collected about the user and used by the computing device and computing system.

Computing system 110 may determine a set of applications installed on computing device 100 that need to be updated based on the request for application update information. For example, computing system 100 may determine, based on the listing of applications and the respective version information for each installed application, that application 106A (e.g., a photography application) and application 106N (e.g., a music application) may each have a pending application update available (e.g., on the application store).

As shown in FIG. 1, computing system 110 includes one or more processors 113 and memory 114. Processors 113 may implement functionality and/or execute instructions associated with computing system 110. Examples of processors 113 include application processors, display controllers, auxiliary processors, one or more sensor hubs, and any other hardware configure to function as a processor, a processing unit, or a processing device. Machine learning model 116, application update module 117, model evaluation module 118, model trainer 119, and the like may be operable (or, in other words, executed) by processors 113 to perform various actions, operations, or functions of computing system 110. That is, modules 116-119 may form executable bytecode, which when executed, cause processors 113 to perform specific operations in accordance with (e.g., causing computing system 110 to become a specific-purpose computer by which to perform) various aspects of the techniques described herein.

Computing system 110 may further include memory 114. Memory 114 may store application update repository 115, a machine learning model 116, an application update module 117, and a model evaluation module 118. Memory 114 may, in some examples, be described as a computer-readable storage medium. In some examples, memory 114 is a temporary memory, meaning that a primary purpose of memory 114 is not long-term storage. Memory 114 may also be described as a volatile memory, meaning that memory 114 does not maintain stored contents when computing system 110 is turned off. Examples of volatile memories include random access memories (RAM), dynamic random access memories (DRAM), static random access memories (SRAM), and other forms of volatile memories known in the art. In some examples, memory 114 may be used to store program instructions for execution by processors 113. Memory 114 may be used by software or applications running on computing system 110 (e.g., software required to analyze applications available through an online application store) to temporarily store information during program execution.

Responsive to receiving the request for application update information, application update module 117 may determine a set of applications from applications 106 have outstanding updates (i.e., updates that have not yet been successfully installed on computing device 100). For example, application update module 117 may perform a lookup in application update repository 115 to determine which, if any, of applications identified in the application update information have outstanding updates. As one example, the application update information includes an indication that photography application 106A, music application 106N, and a social network application are installed on computing device 100. Application update module 117 may execute a query to retrieve current version information for one or more of these applications. Application update module may compare the retrieved current version information to the currently installed version of photography application 106A, music application 106N, and the social network application. Based on the version information comparison, application update module 117 may determine that one or more of the applications have outstanding updates.

To facilitate prioritization of application updates, computing system 110 may determine an update priority score for each application from the set of applications by applying machine learning model 116. Machine learning model 116 may use input data stored in application update repository 115 to provide output data, such as update priority scores. The input data in application update repository 115 may include application usage, installation history, device-specific automatic application update network settings, and the like. For example, computing system 110 may provide at least some of the information included in the request for application update information as well as other information, such as historical application usage information (e.g., user-specific usage, global usage, usage by similar users, etc.), collected and stored by computing system 110 to machine learning model 116. Machine learning model 116 processes the inputs and generates an update priority score for applications having pending updates (e.g., photography application 106A and music application 106N).

As shown by elements 108A and 108N in GUI 104, machine learning module 116 generated an update priority score for photography application 106A of 90 and an update priority score for music application 106N of 85. The magnitude of the update priority score may be indicative of the priority of the application update. Thus, an update priority score of 90 may indicate that the application update for photography application 106A is of higher priority than music application 106N. While FIG. 1 includes GUI 104, in various examples, computing device 100 may not output a GUI that includes the update priority scores for one or more of applications 106. Instead, computing device 100 may simply process the application updated based, at least in part, on the update priority scores without outputting GUI 104 at all or may output a list of outstanding application updates based, at least in part, on the update priority scores, as non-limiting examples.

Computing system 110 may send an indication of the update priority scores or the priority scores themselves to computing device 100. Responsive to receiving the indication of the priority scores, application management module 107 may determine, based on the indication of the update priority scores, an order in which to request application updates such that application updates that have a higher likelihood of successful installation and for applications the user uses most frequently are prioritized over other application updates. For example, the order of the application updates may indicate that computing device 100 should send an update request for application 106A first because application 106A has the largest update priority score. The order of the application updates may further indicate that an update request for application 106N second because application 106N has the second-largest update priority score.

Computing device 100 may generate an update request for one or more of the set of applications having pending updates. For example, computing device may generate an update request for photography application 106A because photography application 106A has a larger update priority score (e.g., 90) than music application 106N (e.g., 85), indicating that installing the update to photography application 106A is of higher priority than installing the update to music application 106N. The update request may identify the applications to be updated, permission settings (e.g., network preference), and the like.

Computing device 100 may send the update request to computing system 110. In response to receiving the update request, application update module 117 may initiate installation of the at least one application update at computing device 100. For example, application update module 117 may send, via network 108, one or more application update install packages to computing device 110. Responsive to receiving the application update install packages, application management module may initiate installation of at least one of the application update install packages.

In some examples, computing system 110 may use model evaluation module 118 to determine the effectiveness of one or more machine learning models based on a variety of metrics. For example, computing system 110 may use model evaluation module 118 to determine the effectiveness of a first machine learning model based on a set of application updates installed on a first computing device that were prioritized based on the respective first update priority score for each application generated by the first machine learning model. Computing system 110 may further use model evaluation module 118 to determine the effectiveness of a second machine learning model based on a set of application updates installed on a second computing device that were prioritized based on a respective second update priority scoring for each application generated by the second machine learning model. Computing system 110 may then select, based on the effectiveness of the first machine learning model and the effectiveness of the second machine learning model, a more effective one of the first and second machine learning models to use for prioritizing future application updates as a preferred machine learning model.

Computing system 110 may further include model trainer 119. Model trainer 119 may train machine learning model 116 to improve the effectiveness of machine learning model 116. Model trainer 119 may train machine learning model 116 in an offline fashion or an online fashion. In offline training (also known as batch learning), machine learning model 216 may be trained on the entirety of a static set of training data. In online learning, machine learning model 216 may be continuously trained (or re-trained) as new training data becomes available (e.g., as new information about application usage, installation history, and context is generated).

While described as being stored at and executed by computing system 110, in some examples, some or all of application update repository 115, machine learning model 116, application update module 117, and model evaluation module 118 may be stored and/or executed at computing device 100 such that the functionality provided by one or more of application update repository 115, machine learning model 116, application update module 117, and model evaluation module 118 may be provided by computing device 100 without requiring computing device 100 to send and receive information with computing system 110. In other words, some or all of the techniques described in this disclosure may be performed locally at computing device 100.

Various aspects of the techniques may improve the operation of computing device 100 by increasing the likelihood of successful installation of application updates for applications that are relatively important to the user. By prioritizing updates in this manner, the number of failed application update installs may be reduced, which may reduce bandwidth, processor, and power usage of the device. Further, by prioritizing application updates for those applications in which the user of the computing device is most interested and/or more frequently uses, application updates for relatively unimportant applications may not be downloaded, which may also reduce bandwidth usage (e.g., by not downloading undesirable application updates) and reduce CPU usage (e.g., by prioritizing updates more likely to be successfully installed, resulting in fewer failed installations). Moreover, prioritizing updates for applications the user uses frequently may aid in reducing crashes or other bugs in such applications.

Figure 2:
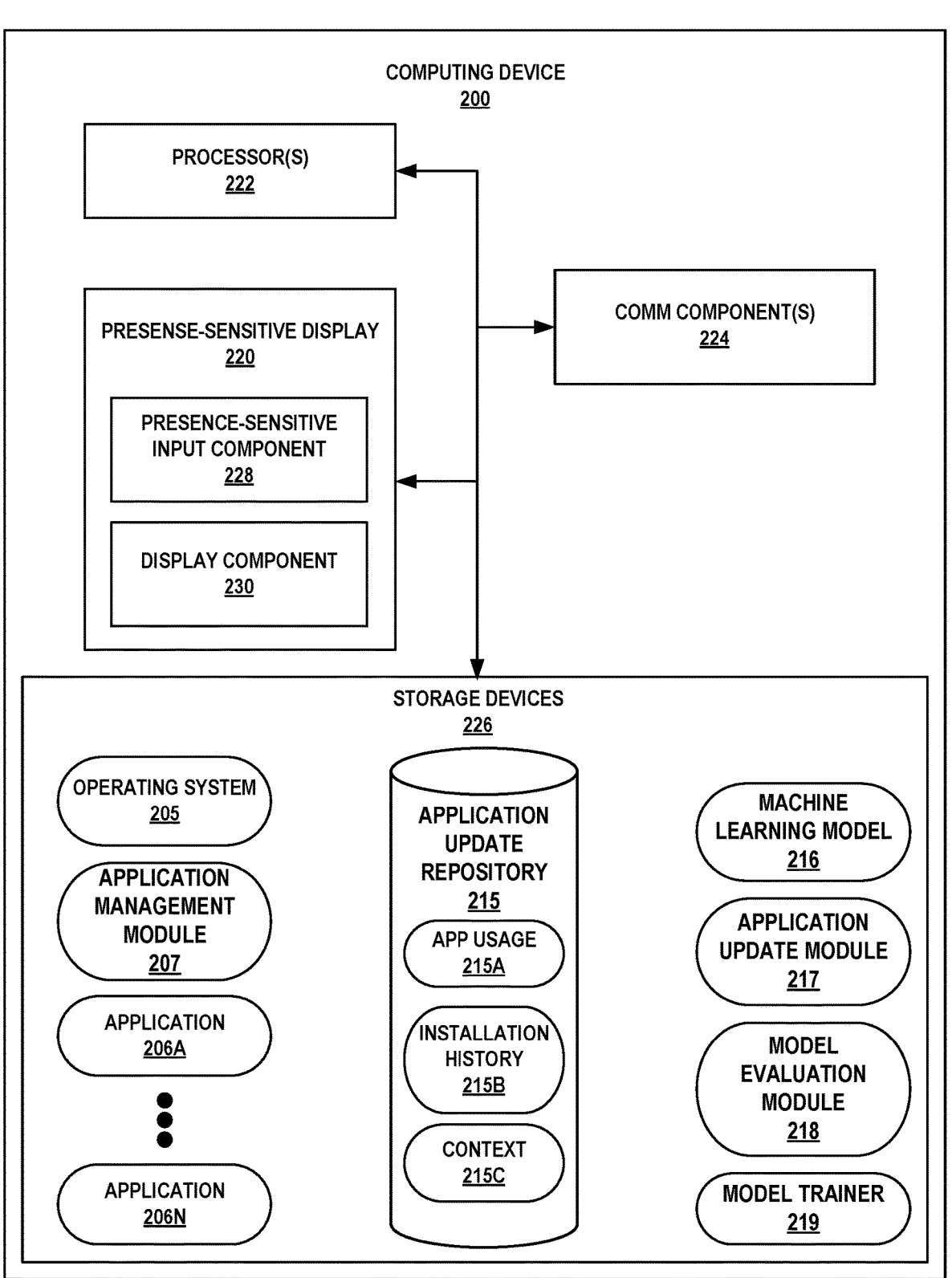
FIG. 2 is a block diagram illustrating an example computing device for prioritizing application updates in accordance with techniques of this disclosure.

FIG. 2 is a conceptual diagram illustrating an example computing device for prioritizing application updates in accordance with techniques of this disclosure. Computing device 200 shown in the example of FIG. 2 is one example of computing device 100 shown in FIG. 1. Further, computing device 200 shown in the example of FIG. 2 locally implements a machine learning model and performs one or more other tasks that may otherwise be performed by computing system 110.

As shown in the example of FIG. 2, computing device 200 includes presence-sensitive display 220, which may be similar if not substantially similar to 120, one or more processors 222, one or more COMM components 224, which may be similar if not substantially similar to 124, and one or more storage devices 226. Storage devices 226 of computing device 200 may include an operating system 205 that provides an execution environment for one or more applications 206 and modules, as well as application management module 207, machine learning model 216, application update module 217, model evaluation model 218, and model trainer 219. Modules 206-219 may be similar if not substantially similar to modules 106-119.

Presence-sensitive display 220 of computing device 200 may include functionality of an input component and/or an output component. In the example of FIG. 2, presence-sensitive display 220 may include a presence-sensitive input (PSI) component 228 ("PSI component 228"), such as a presence-sensitive screen or touch-sensitive screen. In some examples, presence-sensitive input component 228 may detect an object at and/or near the presence-sensitive input component. As one example range, presence-sensitive input component 228 may detect an object, such as a finger or stylus that is within two inches or less of presence-sensitive input component 228. Presence-sensitive input component 228 may determine a location (e.g., an (x,y) coordinate) of the presence-sensitive input component at which the object was detected. In another example range, presence-sensitive input component 228 may detect an object two inches or less from presence-sensitive input component 228 and other ranges are also possible. Presence-sensitive input component 228 may determine the location of presence-sensitive input component 228 selected by a user's finger using capacitive, inductive, and/or optical recognition techniques.

In some examples, presence-sensitive display 220 may also provide output to a user using tactile, audio, or video stimuli. For example, presence-sensitive display 220 may include display component 230 that displays a graphical user interface. Display component 230 may be any type of output component that provides visual output such as a liquid crystal display (LCD), dot matrix display, light emitting diode (LED) display, microLED display, organic light-emitting diode (OLED) display, e-ink, active matrix organic light-emitting diode (AMOLED) display, etc. While illustrated as an integrated component of computing device 200, presence-sensitive display 220 may, in some examples, be an external component that shares a data or information path with other components of computing device 200 for transmitting and/or receiving input and output.

For example, presence-sensitive display 220 may be a built-in component of computing device 200 located within and physically connected to the external packaging of computing device 200. In another example, presence-sensitive display 220 may be an external component of computing device 200 located outside and physically separated from the packaging of computing device 200. In some examples, presence-sensitive display 220, when located outside of and physically separated from the packaging of computing device 200, may be implemented by two separate components: a presence-sensitive input component 228 for receiving input and a display component 230 for providing output.

One or more processors 222 may implement functionality and/or execute instructions associated with computing device 200. Examples of processors 222 include application processors, display controllers, auxiliary processors, one or more sensor hubs, and any other hardware configured to function as a processor, a processing unit, or a processing device. Operating system 205, applications 206, application management module 207, machine learning model 216, and the like may be operable (or, in other words, executed) by processors 222 to perform various actions, operations, or functions of computing device 200. That is, modules 205-219 may form executable bytecode that, when executed, cause processors 222 to perform specific operations in accordance with (e.g., causing computing device 200 to become a specific-purpose computer by which to perform) various aspects of the techniques described herein. For example, processors 222 of computing device 200 may retrieve and execute instructions stored by storage devices 226 that cause processors 222 to perform the operations described herein that are attributed to operating system 205, applications 206, and projection application 220. The instructions, when executed by processors 222, may cause computing device 200 to store information within storage devices 226, such as in application update repository 215.

One or more storage devices 226 within computing device 200 may store information for processing during operation of computing device 200 (e.g., computing device 200 may store data accessed by operating system 205 during execution at computing device 200). Storage devices 226 may further store data associated with application update repository 215, machine learning model 216, application management module 217, model evaluation module 218, and model trainer 219.

In some examples, storage device 226 is a temporary memory, meaning that a primary purpose of storage device 226 is not long-term storage. Storage devices 226 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, storage devices 226 may also include one or more computer-readable storage media. Storage devices 226 in some examples include one or more non-transitory computer-readable storage mediums. Storage devices 226 may be configured to store larger amounts of information than typically stored by volatile memory. Storage devices 226 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 226 may store program instructions and/or information (e.g., data) associated with operating system 205, applications 206, and application management module 207.

As further shown in the example of FIG. 2, application update repository includes information regarding application usage 215A, installation history 215B, and context 215C. Application usage 215A may include information about the frequency, duration, and the like the user of computing device 200 uses each of applications 206. Further, application usage 215A may include such information for any devices or users that download, install, or otherwise interact with an application store provided by computing system 110 of FIG. 1. For example, the information about the frequency the user uses each application may include the number of times the user opens the application, the number of times the user interacts with the application, the amount of time the user interacts with the application, and the like for a pre-determined time period (e.g., a day, week, month, etc.).

Installation history 215B may include information about the attempts by computing device 200 to install each application from the set of applications. For example, the information about the attempts by computing device 200 may include the number of times computing device 200 attempted to install an application update, the number of successful application update attempts, the number of unsuccessful application update attempts, the amount of time since the prior application update was installed by computing device 200, and the like for a pre-determined time period.

Context 215C may include information about failed attempts to install application updates for each application from the set of applications. For example, the information about failed attempts to install application updates may include the available memory space, the size of the application update, the automatically application update network settings active at the time of the attempted application update install, and the like.

While examples are described where a computing device and/or a computing system analyzes information (e.g., application usage, device usage, installation histories, etc.) associated with a computing device and a user of a computing device, the computing device and/or computing system may analyze the information only if the computing device receives permission from the user of the computing device to analyze the information. For example, in situations discussed below, before a computing device or computing system may collect or may make use of information associated with a user, the user may be provided with an opportunity to provide input to control whether programs or features of the computing device and/or computing system may collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally identifiable information is removed. Thus, the user may have control over how information is collected about the user and used by the computing device and computing system.

In various instances, computing device 200 may transmit the update request and the data associated with the application update without any interaction or activity on the part of the user of computing device 200. The device user does not need to, for example, review the request, input commands to computing device 200 to install the application update, or otherwise interact with the device for the installation to occur.

In some examples, computing device 200 may include a model evaluation module 218. For example, computing device 200 may use model evaluation module 218 to determine the effectiveness of one or more machine learning models based on a variety of metrics. Computing device 200 may then select, based on the effectiveness of the one or more machine learning models, the most effective one to use for prioritizing future application updates as a preferred machine learning model.

Computing device 200 may also include model trainer 219. That is, model trainer 219 may train machine learning model 216 in an offline fashion or an online fashion. In offline training (also known as batch learning), machine learning model 216 may be trained on the entirety of a static set of training data. In online learning, machine learning model 216 may be continuously trained (or re-trained) as new training data becomes available (e.g., as new information about application usage, installation history, and context is generated). Model trainer 219 may perform centralized training of machine learning model 216 (e.g., based on a centrally stored dataset). In other examples, decentralized training techniques such as distributed training, federated learning, or the like may be used to train, update, or personalize machine learning model 216.

In some examples, machine learning model 216 may be trained by optimizing an objective function, such as the effectiveness of machine learning model 216. The objective function may be or include a loss function that compares (e.g., determines a difference between) output data generated by the model from the training data and labels (e.g., ground-truth labels) associated with the training data. For example, the loss function may evaluate a sum or mean of squared differences between the output data and the labels. In some examples, the objective function may be or include a cost function that describes a cost of a certain outcome or output data. Other examples of the objective function may include margin-based techniques such as, for example, triplet loss or maximum-margin training.

One or more of various optimization techniques may be performed to optimize the objective function. For example, the optimization technique(s) may minimize or maximize the objective function. Example optimization techniques include Hessian-based techniques and gradient-based techniques, and the like. Other optimization techniques include black box optimization techniques and heuristics.

In some examples, backward propagation of errors may be used in conjunction with an optimization technique (e.g., gradient based techniques) to train machine learning model 216 (e.g., when machine-learned model is a multi-layer model such as an artificial neural network). For example, an iterative cycle of propagation and model parameter (e.g., weights) update may be performed to train machine learning model 216. Example backpropagation techniques include truncated backpropagation through time, Levenberg- Marquardt backpropagation, and the like.

To prioritize application updates in accordance with techniques of this disclosure, computing device 200 may execute (e.g., by using operating system 205, processors 222, storage devices 226, etc.) application management module 207 to send a request for application update information for one or more applications 206 installed on computing device 100 to application update module 217. Applications 206 may include application 206A and application 206N, which may, for example, be a photography application and a music application, respectively. The request for application update information may include application management information, which computing device 200 may access by using application management module 207.

The application management information may include information identifying computing device 200 and configuration information pertaining to computing device 200. The application management information may also identify one or more applications installed on computing device 200. The application management information may include, for example, a listing of applications (e.g., application 206A, application 206N, etc.) installed on computing device 200. The information identifying the installed applications may include information such as a name (e.g., "photography application", "music application", etc.) or other text-based identifier and version information for the installed applications.

The application management information may also identify one or more granted permission settings associated with each installed application. The permission settings for each installed application may control how each application interacts with other parts of computing device 200, with network 108 and computing system 110, and with other devices. Permission settings may include connection settings. Connection settings may control how computing device 200 communicates with other devices using, for example, USB, Bluetooth®, WIFI, or other communication methods.

The connection settings may also include the option of the device user setting a network preference for downloading application updates. For example, the device user may set a network preference to automatically download an application update only when computing device 200 is connected to the internet via WIFI. The network preference for downloading an application update (e.g., based on the size of the application update) may be set for all applications installed on computing device 200 or on an application-by-application basis. Additionally, the connection settings may include application update size limitations. For example, application updates over a certain size may be restricted to automatically updating in the presence of a WIFI connection.

Application update module 217 may use the application management information to determine a set of applications installed on computing device 200 that need to be updated. For example, application update module 217 may determine that photography application 206A and music application 206N each have a pending application update available. To facilitate prioritization of application updates, application update module 217 may cause computing device 200 to apply machine learning model 216 to information and/or data stored in application update repository 215 to determine an update priority score for each application from the set of applications. That is, machine learning model 216 may use input data, such as application usage 215A, installation history 215B, context 215C, and the like stored in application update repository 215 to provide output data in the form of update priority scores.

By using the information in application update repository 215 (e.g., application usage 215A, installation history 215B, context 215C, etc.), machine learning model 216 may provide update priority scores that are indicative of the likelihood of successful installation of an application update and the relative importance (e.g., based on the frequency and amount of time the user uses the application) of each application from the set of application. Thus, the update priority scores may, in this respect, facilitate prioritization of application updates by identifying the application updates that have both a higher likelihood of successful installation and a relatively high importance to the user.

Machine learning model 216 may represent one or more of various different types of machine-learned models. In particular, in some examples, machine learning model 216 may perform regression, clustering, anomaly detection, and/ or other tasks.

In some examples, machine learning model 216 may perform regression to provide output data in the form of a continuous numeric value. The continuous numeric value may correspond to any number of different metrics or numeric representations, including, for example, currency values, scores, or other numeric representations. As examples, machine learning model 216 may perform linear regression, polynomial regression, or nonlinear regression. As examples, machine learning model 216 may perform simple regression or multiple regression. As described above, in some examples, a Softmax function or other function or layer may be used to squash a set of real values respectively associated with a two or more possible classes to a set of real values in the range (0, 1) that sum to one.

Machine learning model 216 may perform various types of clustering. For example, machine learning model 216 may identify one or more previously-defined clusters to which the input data most likely corresponds. Machine learning model 216 may identify one or more clusters within the input data. That is, in instances in which the input data includes multiple objects, documents, or other entities, machine learning model 216 may sort the multiple entities included in the input data into a number of clusters. In some examples in which machine learning model 216 performs clustering, machine learning model 216 may be trained using unsupervised learning techniques.

Machine learning model 216 may perform anomaly detection or outlier detection. For example, machine learning model 216 may identify input data that does not conform to an expected pattern or other characteristic (e.g., as previously observed from previous input data). As examples, the anomaly detection may be used for detecting failures to install application updates.

After applying machine learning model 216 to determine the update priority scores for the set of applications, application update module 217 may send an indication of the update priority scores to application management module 207. For example, the indication of the update priority scores for photography application 206A and music application 206N may be 90 and 85, respectively. Computing device 200 and/or application management module may then send, based on the update priority scores, an update request for at least one application from the set of applications to a computing system (e.g., computing system 110) using COMM components 224. The update request may identify the applications to be updated, permission settings (e.g., network preference), and the like. For example, the update request may identify photography application 206A as the application to be updated when computing device 200 is connected to WIFI because photography application 206A has the largest update priority score in the set of applications. Computing system 110 may initiate, responsive to the update request, installation of the at least one application update for computing device 200 to install.

In some examples, computing device 200 may include a model evaluation module 218. Computing device 200 may use model evaluation module 218 to determine the effectiveness of one or more machine learning models based on a variety of metrics. The metrics may include, but are not limited to, an application freshness metric, an application freshness for active users metric, an application update coverage metric, and an application update efficiency metric.

The application freshness metric may represent a percentage of the computing devices included in an application's installation base that have installed the application for the first time ("fresh install"), and is thus running the most recent version of the application as of the date of installation, within a pre-determined time period. The application freshness metric may be evaluated using the following equation:

$$AppFreshness = \frac{num(\text{fresh } Apps)}{num(Apps)}$$

As used here, fresh Apps may be defined as the fresh installs of the application within the pre-determined time period. Apps may be defined as the size of the application's installation base. Thus, AppFreshness may represent the number of fresh installs of the application within a pre-determined time period divided by the number of computing devices that have installed the application.

The application freshness for active users metric may represent a percentage of the computing devices included in an application's installation base that have freshly installed the application within a first pre-determined time period and whose users have used the application (e.g., based on the number of times the user opens the application, the number of times the user interacts with the application, the amount of time the user interacts with the application, etc.) within a second pre-determined time period. The application freshness for active users metric may be evaluated using the following equation:

$$AppFreshnessForActiveUsers = \frac{num(\text{fresh used } Apps)}{num(\text{used } Apps)}$$

As used here, fresh used Apps may be defined as the fresh installs of the application within a first-predetermined time period that have also been used by the users of the computing devices within a second pre-determined time period. used Apps may be defined as the size of the subset of the application's installation base that only includes applications that have been used within the second pre-determined time period. Thus, AppFreshness may represent the number of fresh installs of the application within the first pre-determined time period that have been used by the users of the computing device within the second pre-determined time period divided by the number of computing devices that have run the application within the second pre-determined time period.

The application update coverage metric may represent a percentage of the computing devices included in an application's installation base that ran a stale (e.g., an outdated version of an application) version of the application within a first pre-determined time period and whose users used the application within a second pre-determined time period. The application update coverage metric may be evaluated using the following equation:

$$UpdateCoverage = \frac{num(\text{updates on stale used } Apps)}{num(\text{stale used } Apps)}$$

As used here, updates on stale used Apps may be defined as the stale versions of the application that were updated to the most recent version of the application within a first-predetermined time period that have also been used by the users of the computing devices within a second pre-determined time period—stale used Apps may be defined as the size of the subset of the application's installation base that only includes computing devices that ran a stale version of the application within the first pre-determined time period that was used by the users of the computing devices within the second pre-determined time period. Thus, UpdateCoverage may represent the number of stale versions of the application that have been updated within the first pre-determined time period that have been used by the users of the computing device within the second pre-determined time period divided by the number of computing devices that ran a stale version of the application within the first pre-determined time period that was used by the users of the computing devices within the second pre-determined time period.

The application update efficiency metric may represent a percentage of the computing devices included in an application's installation base that ran a stale version of the application within a first pre-determined time period and whose users used the application after updating the appli-cation within a second pre-determined time period. The application update efficiency metric may be evaluated using the following equation:

$$UpdateEfficiency = \frac{num(\text{updates on stale used } Apps)}{num(\text{updates on stale } Apps)}$$

As used here, updates on stale Apps may be defined as the size of the subset of the application's installation base that only includes computing devices that ran a stale version of the application within the first pre-determined time period that was updated. Thus, UpdateEfficiency may represent the number of stale versions of the application that have been updated within the first pre-determined time period that have been used by the users of the computing device within the second pre-determined time period divided by the number of computing devices that ran a stale version of the application within the first pre-determined time period that updated.

The data necessary to evaluate these metrics may be collected regularly, intermittently, and/or according to application management instructions (e.g., from OS 205, application management module 207, etc.) and using known techniques. For example, the data may be aggregated, packaged, and stored in storage devices 226 every day for at least 35 days. Model evaluation module 218 may then use the data to determine the effectiveness of machine learning model 216.

In some examples, model evaluation module 218 may assign a respective weight to the application freshness metric, the application freshness for active users metric, the application update coverage metric, and the application update efficiency metric. Model evaluation module 218 may then use an algorithm to determine, based on the metrics, the effectiveness of machine learning model 216.

In some examples, computing device 200 may use model evaluation module 218 to determine the effectiveness of one or more machine learning models based on these metrics. For example, model evaluation module 218 may use these metrics to evaluate the effectiveness of a set of application updates installed on a first computing device that were prioritized based on the respective first update priority score for each application generated by the first machine learning model. Similarly, computing device 200 may further use model evaluation module 218 to determine the effectiveness of a second machine learning model based on a set of application updates installed on a second computing device that were prioritized based on a respective second update priority scoring for each application generated by the second machine learning model. Computing device 200 may then select, based on the effectiveness (e.g., the output of the algorithm based on the metrics) of the first machine learning model and the effectiveness of the second machine learning model, a more effective one of the first and second machine learning models to use for prioritizing future application updates as a preferred machine learning model.

Model trainer 219 may train machine learning model 216 using one or more metrics (e.g., the application freshness metric, the application freshness for active users metric, the application update coverage metric, the application update efficiency metric, etc.). For example, model trainer 219 may attempt to optimize the objective function. The objective function may be to maximize effectiveness of machine learning model 216 based on the application freshness metric, the application freshness for active users metric, the application update coverage metric, and the application update efficiency metric. As a result, model trainer 219 may improve the effectiveness of machine learning model 216 to output update priority scores that are indicative of the likelihood of successful installation of application updates and the relative importance of the application updates to the user.

While computing device 200 of FIG. 2 is shown as including machine learning module 216, application update module 217, model evaluation module 218, and model trainer 219, in other examples one or more of modules 216, 217, 218, or 219 may be stored at a remote computing system (e.g., computing system 110 of FIG. 1) and the functionality provided by modules 216, 217, 218, or 219 may be provided by such a remote computing system. By including one or more of modules 216, 217, 218, or 219, computing device 200 may perform techniques of this disclosure on device (i.e., without sending application usage information, network settings information, application installation information, application update history information, etc.) to a remote computing system.

Figure 3:
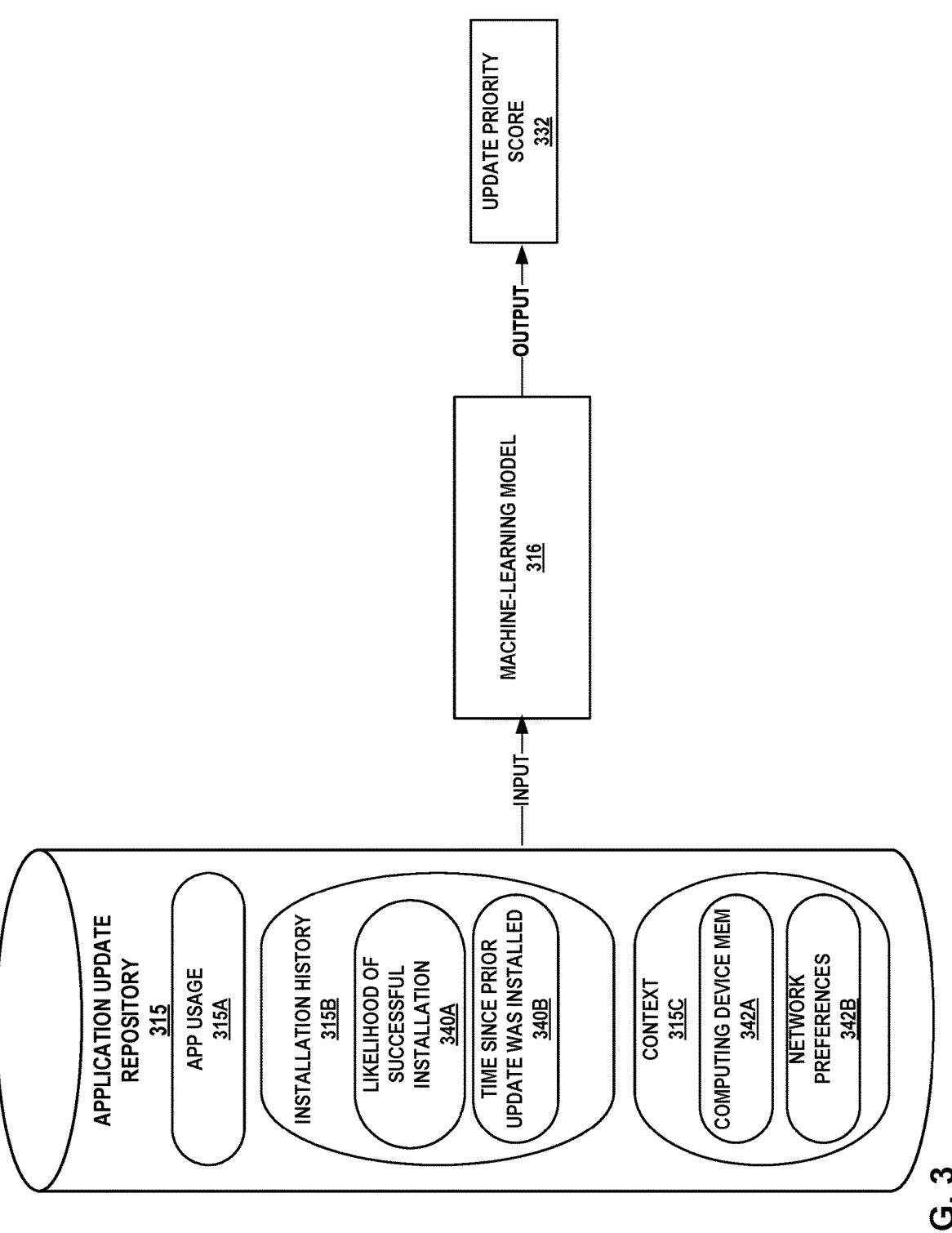
FIG. 3 is a block diagram illustrating aspects of an example machine-learning model for prioritizing application updates in accordance with techniques of this disclosure.

FIG. 3 is a block diagram illustrating aspects of an example machine-learning model for prioritizing application updates in accordance with techniques of this disclosure. As illustrated in FIG. 3, a machine learning model 316, which may be similar if not substantially similar to machine learning model 116, 216, is trained to receive input data of one or more types and, in response, provide output data of one or more types. Thus, FIG. 3 illustrates machine learning model 316 performing inference. The input data may include one or more features that are associated with an instance or an example. In some examples, the one or more features associated with the instance or example may be organized into a feature vector. In some examples, the output data may include one or more predictions. Predictions may also be referred to as inferences. Thus, given features associated with a particular instance, machine learning model 316 may output a prediction for such instance based on the features.

An application update repository 315, which may be similar if not substantially similar to 115, 215, may store input data for machine learning model 316 to access. Application update repository 315 may include application usage 315A, installation history 315B, and context 315C, which may be similar if not substantially similar to application usage 215A, installation history 215B, and context 215, respectively.

Application usage 315A may include information about the frequency the user of a computing device (e.g., computing device 100, 200) uses each application from the set of applications. For example, the information about the frequency the user uses each application may include the number of times the user opens the application, the number of times the user interacts with the application, the amount of time the user interacts with the application, and the like for a pre-determined time period (e.g., a day, week, month, etc.).

Installation history 315B may include information about a likelihood of successful installation 340A. The likelihood of successful installation 340A may be a statistic calculated from the number of installation attempts by the computing device, the number of successful application update installations, the number of unsuccessful application update installations, and the like. For example, if the computing device attempted to install one or more application updates for an application (e.g., application 206A) 10 times, and 7 of those attempts succeeded while 3 attempts failed, the computing device may store a likelihood of successful installation 340A of 70% for the application.

Installation history 315B may further include information about the time since the prior application update for an application was installed. For example, the computing device may store (e.g., in seconds, minutes, hours, days, etc.) the amount of time between when the computing device last downloaded and installed the prior application update and when the computing device last checked for an update, when the computing device installed the most recent version of the application update available, and the like.

Context 315C may include information about a computing device memory 342A. Computing device memory 342A may include information about the available memory of a computing device for installing one or more application updates. Computing device memory 342A may further include information about the available storage of the computing device for installing one or more application updates.

Context 315C may also include information about network preferences 342B. Network preferences 342B may include information about the network connections over which the computing device may download one or more application updates (e.g., from computing system 110, 210). Network preferences 342B for downloading an application update (e.g., based on the size of the application update) may be set for all applications installed on computing device 200 or on an application-by-application basis. Additionally, the connection settings may include application update size limitations. For example, application updates over a certain size may be restricted to automatically updating in the presence of a WIFI connection.

Machine learning model 316 may receive input data (e.g., application usage 315A, installation history 315B, context 315C, etc.) from application update repository 315 to provide output data in the form of an update priority score 332. Update priority score 332 may be based on the input data and thus indicative of the input data. For example, update priority score 332 may be indicative of the likelihood of successfully installing an application update, the application usage history (e.g., which may in turn be indicative of importance) for an application, as well as the staleness (e.g., the amount of time since the prior application update was installed 340B) of the application.

To determine an update priority score, machine learning model may compute a scoring function to formulate an expected value of freshness lift (e.g., the difference between the update priority score of an application prior to an application update and the update priority score for the application immediately following the application update) by using the following equation:

$$\text{Score}(C_i) = f(P_{success\text{-}install}(C_i), P_{app\text{-}open}(C_i), F_{freshness\text{-}lift}(C_i))$$

where $C_i$ represents a candidate application update, $P_{success\text{-}install}(C_i)$ is a value (e.g., in between 0 and 1) representing the likelihood of an application update being successfully installed, where $P_{app\text{-}open}(C_i)$ is a value (e.g., in between 0 and 1) representing the likelihood of an application being opened and/or used (e.g., within a pre-determined time period), and $F_{freshness\text{-}lift}(C_i)$ is a smoothing function applied to the staleness of an application update. For example, $F_{freshness\text{-}lift}(C_i)$ may simply be the staleness of the application in a number of days. Alternatively, $F_{freshness\text{-}lift}(C_i)$ may be a bucketized value computed using known techniques.

$f(P_{success\text{-}install}(C_i), P_{app\text{-}open}(C_i), F_{freshness\text{-}lift}(C_i))$ may indicate a probabilistic expected value. $f(P_{success\text{-}install}(C_i, P_{app\text{-}open}(C_i))$ may indicate how likely an application update will contribute to freshness lift, whereas $F_{freshness\text{-}lift}(C_i)$ may quantify the amount of the freshness lift. $F_{freshness\text{-}lift}$ may be a hand-tuned and/or engineered smoothing function. Machine learning model 316 may estimate $P_{success\text{-}install}(C_i)$ and $P_{app\text{-}open}(C_i)$.

The probabilistic expected value may be used as the updated priority score or may be used as the basis for generating the update priority score. For example, computing system 110 may provide the probabilistic values generated for each of the applications having outstanding updates to computing device 100. In some instances, applicant update module 117 may normalize, weight, or otherwise adjust the probability expected values generated by machine learning model 316 to generate the update priority scores.

Figure 4:
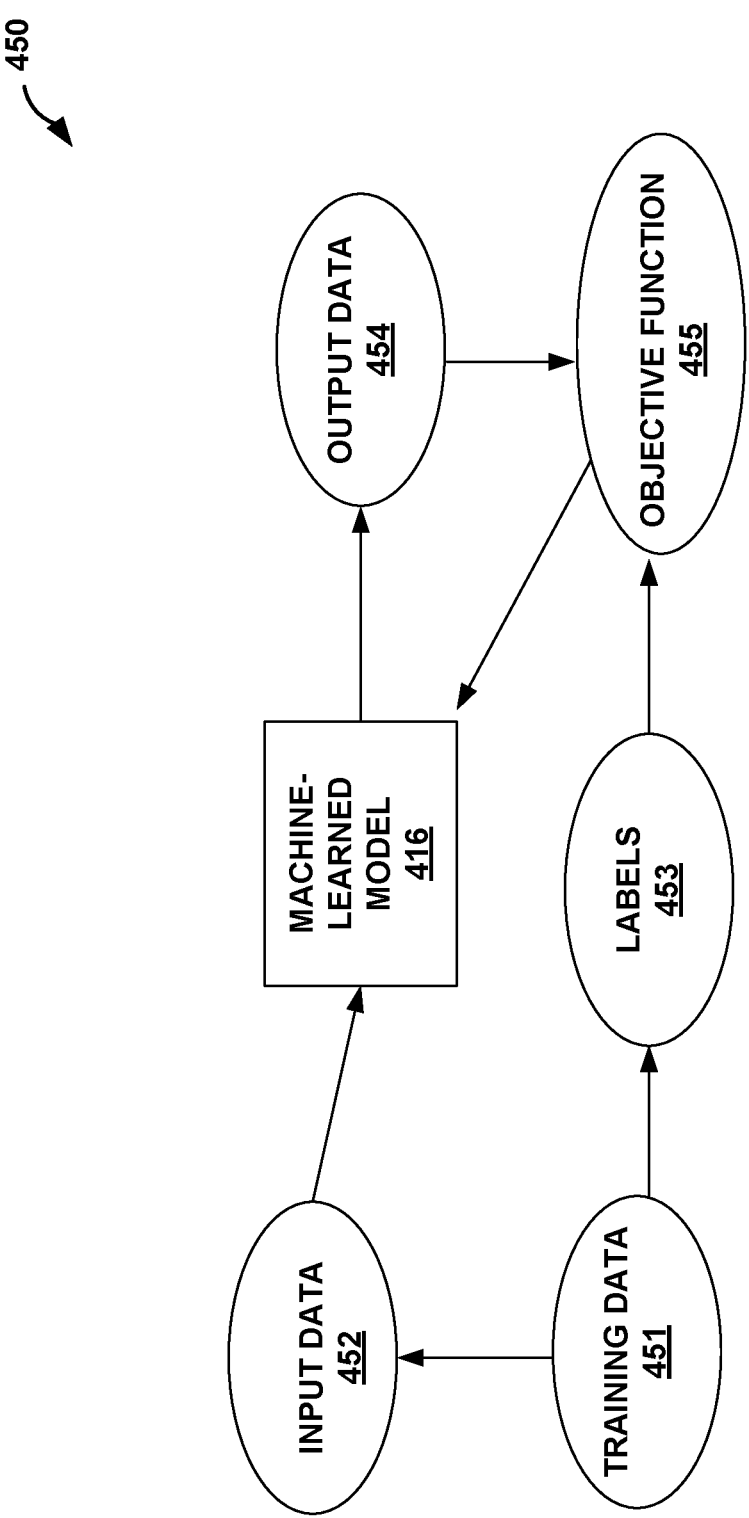
FIG. 4 is a block diagram illustrating an exemplary operation of the machine learning model in accordance with techniques of this disclosure.

FIG. 4 is a block diagram illustrating an exemplary operation of the machine learning model in accordance with techniques of this disclosure. As shown in FIG. 4, an example training process 450 is used to train machine learning model 416, which may be similar if not substantially similar to machine learning model 116, 216, 316. Machine learning model 416 is trained on training data 451 that includes input data 452 that has labels 453. Training processes 450 is one example training process; other training processes may be used as well.

Training data 451 used by training process 450 may include, upon user permission for use of such data for training, anonymized usage logs of sharing flows, e.g., content items that were shared together, bundled content pieces already identified as belonging together, e.g., from entities in a knowledge graph, etc. In some examples, training data 451 may include examples of input data 452 (e.g., application usage 315A, installation history 315B, context 315C, etc.) that correspond to output data 454 (e.g., update priority score 332) that have been assigned labels 453 that correspond to output data 454.

In some examples, machine learning model 416 may be trained by optimizing an objective function, such as objective function 455. For example, in some examples, objective function 455 may be or include a loss function that compares (e.g., determines a difference between) output data generated by the model to the training data and output data (e.g., ground-truth update priority scores) associated with the training data. For example, the loss function may evaluate a sum or mean of squared differences between the output data and the labels. In some examples, objective function 455 may be or include a cost function that describes a cost of a certain outcome or output data. Other examples of objective function 455 may include margin-based techniques such as, for example, triplet loss or maximum-margin training.

One or more of various optimization techniques may be performed to optimize objective function 455. For example, the optimization technique(s) may minimize or maximize objective function 455. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some examples, backward propagation of errors may be used in conjunction with an optimization technique (e.g., gradient based techniques) to train machine learning model 416 (e.g., when machine-learned model is a multi-layer model such as an artificial neural network). For example, an iterative cycle of propagation and model parameter (e.g., weights) update may be performed to train machine learning model 416. Example backpropagation techniques include truncated backpropagation through time, Levenberg- Marquardt backpropagation, etc.

In some examples, machine learning model 416 described herein may be trained using unsupervised learning techniques to increase the effectiveness of machine learning model 416 (e.g., based on the application freshness metric, application freshness for active users metric, etc.). Unsupervised learning may include inferring a function to describe hidden structure from unlabeled data. For example, a classification or categorization may not be included in the data. Unsupervised learning techniques may be used to produce machine-learned models capable of performing clustering, anomaly detection, learning latent variable models, or other tasks.

Machine learning model 416 may be trained to increase the effectiveness of machine learning model 416 using semi-supervised techniques which combine aspects of supervised learning and unsupervised learning. Machine learning model 416 may be trained or otherwise generated through evolutionary techniques or genetic algorithms. In some examples, machine learning model 416 described herein may be trained using reinforcement learning. In reinforcement learning, an agent (e.g., model) may take actions in an environment and learn to maximize rewards and/or minimize penalties that result from such actions. Reinforcement learning may differ from the supervised learning problem in that correct input/output pairs are not presented, nor sub-optimal actions explicitly corrected.

In some examples, machine learning model 416 described herein may include or otherwise be impacted by a number of hyperparameters, such as, for example, learning rate, number of layers, number of nodes in each layer, number of leaves in a tree, number of clusters; etc. Hyperparameters may affect model performance. Hyperparameters may be hand selected or may be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some examples, various techniques may be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some examples, transfer learning techniques may be used to provide an initial model from which to begin training of machine learning model 416 described herein.

In some examples, machine learning model 416 described herein may be included in different portions of computer-readable code on a computing device. In one example, machine learning model 416 may be included in a particular application or program and used (e.g., exclusively) by such particular application or program. Thus, in one example, a computing device may include a number of applications and one or more of such applications may contain its own respective machine learning library and machine-learned model(s).

In another example, machine learning model 416 described herein may be included in an operating system of a computing device (e.g., in a central intelligence layer of an operating system) and may be called or otherwise used by one or more applications that interact with the operating system. In some examples, each application may communicate with the central intelligence layer (and model(s)

stored therein) using an application programming interface (API) (e.g., a common, public API across all applications).

In some examples, the central intelligence layer may communicate with a central device data layer. The central device data layer may be a centralized repository of data for the computing device. The central device data layer may communicate with a number of other components of the computing device, such as, for example, one or more sensors, a context manager, a device state component, and/or additional components. In some examples, the central device data layer may communicate with each device component using an API (e.g., a private API).

To train machine learning model 416 in accordance with techniques of this disclosure, a model trainer (e.g., model trainer 219) may use training data 451 that includes the following input data 452 that have been assigned labels 453 that correspond to output data 454. In some examples, machine learning model 416 may determine a respective update priority score for each application update independently. As such, an order of update priority scores determined using this approach (e.g. $f(P_{success-install}(C_i), P_{app-open}(C_i), F_{freshness-lift}(C_i))$) may rank application updates in a relative order. In another example, machine learning model 316 may determine a relative order between a pair of application updates. In this example, machine learning model 316 may use a similar scoring function to the one described above but apply it to ground truths (e.g., binary values) to label the expected order of two application updates. That is, machine learning model 316 may use the following equation:

$$Score(C_i)=f(\text{is\_success\_install}(C_i), \text{is\_app\_open}(C_i), F_{freshness-lift}(C_i))$$

Further, the order label may be defined using the following algorithm:

$$label_{order}(C_i, C_j)=Score(C_i)>Score(C_j)$$

FIG. 5 is a flowchart illustrating an exemplary operation of the computing system and computing device in accordance with techniques of this disclosure. In the example of FIG. 5, computing device 100 and computing system 110 may operate to prioritize the installation of updates for a set of applications installed on computing device 100 by identifying application updates that have a higher likelihood of successful installation while also prioritizing updates for applications the user uses most frequently. Computing device 100 and the computing system 110 may then apply machine learning model 116 to determine update priority scores for a set of application updates, which computing device 100 may use to prioritize (e.g., rank) the application updates.

As shown in FIG. 5, application update module 117 of computing system 110 may receive a request for application update information from computing device 100 for one or more applications 106 installed on the computing device (500). Computing device 100 may execute application management module 107 to send (e.g., by using COMM components 124) the request for application update information to application update module 117. Applications 106 may include application 106A and application 106N, which may, for example, be a photography application and a music application, respectively. The request for application update information may include application management information, which computing device 210 may access by using application management module 107.

Computing system 110 may determine, based on the request for the application update information, a set of applications that need to be updated (502). For example, application update module 117 may perform a lookup in application update repository 115 to determine which, if any, of applications identified in the application update information have outstanding updates. Application update module 117 may execute a query to retrieve current version information for one or more of these applications. Application update module may compare the retrieved current version information to the currently installed version of photography application 106A, music application 106N, and the social network application. Based on the version information comparison, application update module 117 may determine that one or more of the applications have outstanding updates and include those applications in the set of applications.

Computing system may apply machine learning model 116 to determine a respective update priority score (e.g., update priority score 332) for each application from the set of applications (504). Machine learning model 116 may determine the respective update priority scores based on input data stored in application update repository. For example, machine learning model 116 may use input data (e.g., application usage 215A, installation history 215B, context 215C, etc.) stored in application update repository 115 to provide output data in the form of update priority scores. The update priority score for each application may be indicative of the importance of the application to the user of computing device 100 (e.g., based on application usage 215A, installation history 215B, context 215C, etc.).

Computing system 110 may send an indication of the respective update priority score for the set of applications to computing device 100 (506). The update priority scores may be indicative of the likelihood of successful installation of an application update and the relative importance (e.g., based on the frequency and amount of time the user uses the application) of each application from the set of applications. Thus, the update priority scores may, in this respect, facilitate prioritization of application updates by identifying the application updates that have a higher likelihood of successful installation, a relatively high importance to the user, and a larger amount of freshness lift.

Computing system 110 may receive an update request for at least one application from the set of applications from computing device 100 (508). Computing device 100 may send the update request responsive to and based on the respective update priority scores. The at least one application from the set of applications may be selected by computing device 100 based on the respective update priority scores (e.g., a ranking). Computing system 110, responsive to receiving the update request, may then initiate installation of the pending an update for the at least one application from the set of applications (510).

FIG. 6 is a flowchart illustrating another exemplary operation of the computing system and computing device in accordance with techniques of this disclosure. In the example of FIG. 6, computing system 110 may determine the effectiveness of one or more machine learning models 116 to select, based on the effectiveness of the one or more machine learning models, the most effective one to use for prioritizing future application updates as a preferred machine learning model. However, it should be understood that computing device 100 may also determine the effectiveness of one or more machine learning models in accordance with techniques of this disclosure.

As shown in FIG. 6, computing system 110 may determine the effectiveness of a first machine learning model based on a set of application updates installed on the first computing device that were prioritized based on the respective first update priority score for each application scoring generated by the first machine learning model (600). Computing system 100 may determine the effectiveness of the first machine learning model based on the application freshness metric, the application freshness for active users metric, the application update coverage metric, the application update efficiency metric, and the like. For example, model evaluation module 118 may use the metrics to evaluate the effectiveness of a set of application updates installed on a first computing device that were prioritized based on the respective first update priority score for each application generated by the first machine learning model.

Computing system 110 may further determine the effectiveness of a second machine learning model based on a set of application updates installed on a second computing device that were prioritized based on a respective second update priority score for each application generated by the second machine learning model (602). Similarly, computing system 110 may determine the effectiveness of the second machine learning model based on the application freshness metric, the application freshness for active users metric, the application update coverage metric, the application update efficiency metric, and the like.

Computing system 110 may select, based on the effectiveness of the first machine learning model and the effectiveness of the second machine learning model, a more effective one of the first and second machine learning models to use for prioritizing future application updates as a preferred machine learning model (604). For example, computing system 110 may select the machine learning model that performed better (e.g., had higher scores) for the application freshness metric, the application freshness for active users metric, the application update coverage metric, the application update efficiency metric, and the like.

Furthermore, computing system 110 may use the selected machine learning mas the preferred machine learning model for prioritizing future application updates (606). For example, computing system 110 may receive a subsequent request for application update information for the one or more applications installed on the first computing device. Computing system 110 may determine, based on the subsequent request for the application update information, a subsequent set of applications that need to be updated, where each application from the subsequent set of applications is associated with a respective subsequent pending update. Computing system 110 may apply the preferred machine learning model to determine a respective subsequent update priority score for each application from the subsequent set of applications and send an indication of the respective subsequent update priority scores for the subsequent set of applications to the first computing device. Computing device 100 may then send at least one subsequent update request based on the respective subsequent update priority scores to the computing system.

In this way, computing system 110 may receive at least one subsequent update request for at least one application from the subsequent set of applications, the at least one application from the subsequent set of applications being selected by the first computing device based at least in part on the respective subsequent update priority scores (608). Computing system 100, responsive to receiving the subsequent update request, may initiate installation of the subsequent pending update the at least one application from the subsequent set of applications.

Figure 7:
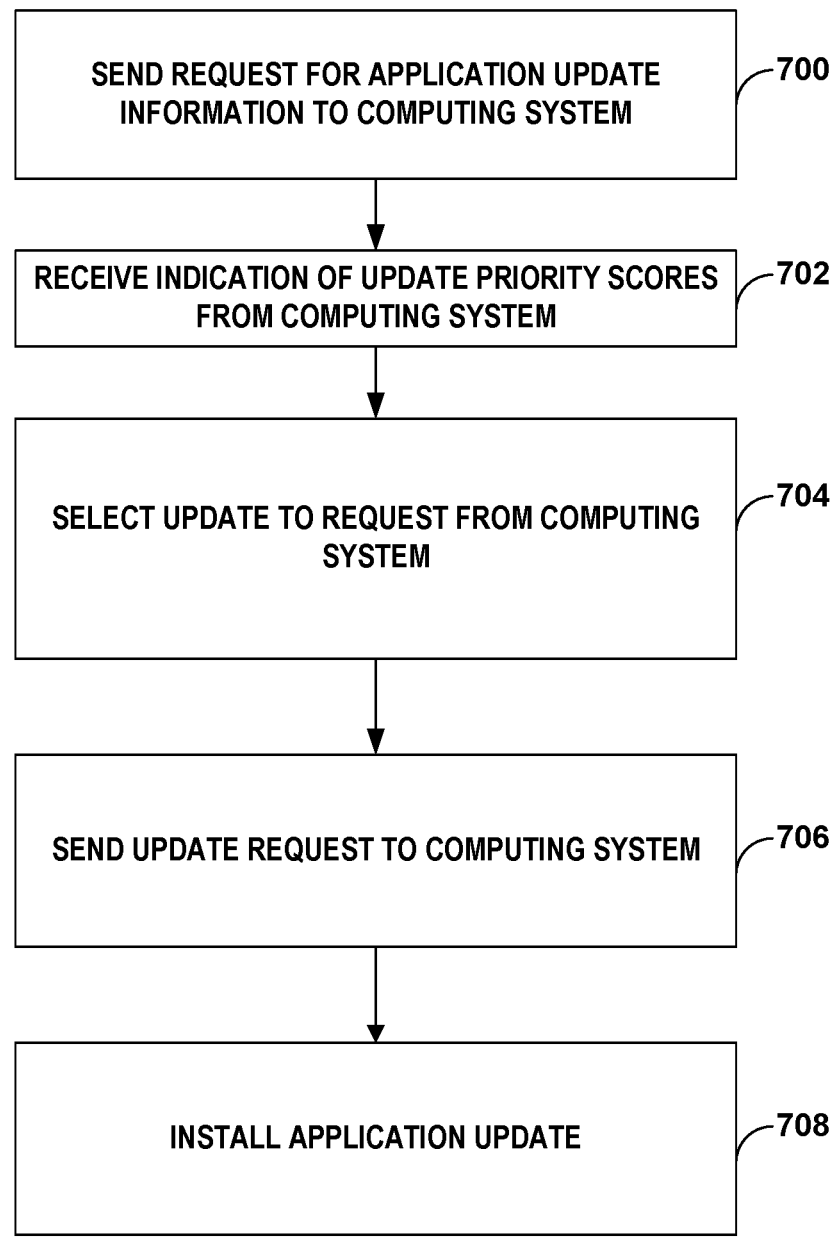
FIG. 7 is a flowchart illustrating an exemplary operation of the computing device in accordance with techniques of this disclosure.

FIG. 7 is a flowchart illustrating an exemplary operation of the computing device in accordance with techniques of this disclosure. In the example of FIG. 7, computing device

100 locally implements a machine learning model and performs one or more other tasks that may otherwise be performed by computing system 110. Computing device 100 may operate to prioritize the installation of updates for a set of applications installed on the computing device by identifying application updates that have a higher likelihood of successful installation while also prioritizing updates for applications the user uses most frequently. Computing device 100 may then apply machine learning model 116 to determine update priority scores for a set of application updates, which computing device 100 may use to prioritize the application updates.

As shown in FIG. 7, computing device 100 may send a request for application update information for one or more applications installed on the computing device to computing system 110 (700). For example, computing device 100 may use application management module 107 to generate application management information for identifying applications 106 installed on computing device 100. In various instances, application management module 107 may be a client application associated with an application repository or store managed and/or provided by computing system 110. That is, computing device 100 may execute application management module 107 to present an online application store graphical user interface (e.g., GUI 104) via presence-sensitive display 120 for an online application store. The application store may be hosted or otherwise provided by computing system 110 and the application store may enable a user of computing device 100 to browse, search, select, purchase, download, and install various applications and application updates on computing device 100.

Computing device 100 may receive an indication of a respective update priority score for each application from the set of applications having a corresponding pending update from computing system 110 (702). Each respective update priority score may be determined by computing system 110 by at least applying a machine learned model to each application of the set of applications having the corresponding pending update. For example, computing system may apply machine learning model 116 to determine a respective update priority score (e.g., update priority score 332) for each application from the set of applications. Machine learning model 116 may determine the respective update priority scores based on input data stored in application update repository. For example, machine learning model 116 may use input data (e.g., application usage 215A, installation history 215B, context 215C, etc.) stored in application update repository 115 to provide output data in the form of update priority scores.

Computing device 100 may select, based on the respective updated priority rankings, at least one corresponding pending update to request from computing system 110 (704). For example, computing device 100 may select a pending update for application 106A if 106A has the largest update priority score, indicating that it is first in the order of update priority scores and that the corresponding application update is the most important one available.

Computing device 100 may send an update request for the at least one corresponding pending update to computing system 110 (706). For example, computing device 100 may generate an update request for one or more of the set of applications having pending updates (e.g., 106A) and send the update request (e.g., by using COMM components 124). Computing device 100 may then install, responsive to computing system 110 initiating the installation, the at least one corresponding pending update, installing, by the computing device, the at least one corresponding pending update (708).

This disclosure includes the following examples.

Example 1: A method includes receiving, by a computing system and from a computing device, a request for application update information for one or more applications installed on the computing device; determining, by the computing system and based on the request for the application update information, a set of applications that need to be updated, where each application from the set of applications is associated with a respective pending update; applying, by the computing system, a machine learning model to determine a respective update priority score for each application from the set of applications; sending, from the computing system and to the computing device, an indication of the respective update priority scores for the set of applications; receiving, by the computing system and from the computing device, an update request for at least one application from the set of applications, the at least one application from the set of applications being selected by the computing device based on the respective update priority scores; and responsive to receiving the update request, initiating, by the computing system, installation of the pending update for the at least one application from the set of applications.

Example 2: The method of example 1, wherein the computing device is a first computing device, wherein the machine learning model is a first machine learning model, and wherein the update priority score is a first update priority score, the method further includes determining, by the computing system, an effectiveness of the first machine learning model based on a set of application updates installed on the first computing device that were prioritized based on the respective first update priority score for each application generated by the first machine learning model; determining, by the computing system, an effectiveness of a second machine learning model based on a set of application updates installed on a second computing device that were prioritized based on a respective second update priority score for each application generated by the second machine learning model; and selecting, by the computing system and based on the effectiveness of the first machine learning model and the effectiveness of the second machine learning model, a more effective one of the first and second machine learning models to use for prioritizing future application updates as a preferred machine learning model.

Example 3: The method of example 2, further includes receiving, by the computing system, a subsequent request for application update information for the one or more applications installed on the first computing device; determining, by the computing system and based on the subsequent request for the application update information, a subsequent set of applications that need to be updated, where each application from the subsequent set of applications is associated with a respective subsequent pending update; applying, by the computing system, the preferred machine learning model to determine a respective subsequent update priority score for each application from the subsequent set of applications; sending, from the computing system and to the first computing device, an indication of the respective subsequent update priority scores for the subsequent set of applications; receiving, by the computing system and from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiating, by the computing system, installation of the subsequent pending update for the at least one application from the subsequent set of applications.

Example 4: The method of example 2 or 3, wherein determining the effectiveness of the first machine learning model is further based on one or more of an application freshness metric, an application freshness for active users metric, an application update coverage metric, and an application update efficiency metric.

Example 5: The method of any of examples 1 through 4, wherein the machine learning model determines the respective update priority score for each application from the set of applications based at least in part on one or more of: one or more of an available memory of the computing device, a usage history for each application from the set of applications, a network preference for installing updates, an amount of time since a prior update for the at least one application from the set of applications was last installed, a respective likelihood of a successful installation of the update for each application, and an amount of time since a prior update for each of the at least one application was last installed.

Example 6: The method of any of examples 1 through 5, wherein the machine learning model determines the respective update priority score for each application by multiplying a probability of the pending update for the application being installed by a probability of application being opened within a pre-determined time period.

Example 7: The method of example 6, wherein the machine learning model determines the respective update priority score for each application by further applying a smoothing function.

Example 8: The method of any of examples 1 through 7, wherein the machine learning model determines the respective update priority score for each application independently.

Example 9: The method of any of examples 1 through 8, wherein the machine learning model determines the respective update priority score for a first application relative to a second application.

Example 10: A computing system includes a memory; and one or more processors configured to: receive, from a computing device, a request for application update information for one or more applications installed on the computing device; determine, based on the request for the application update information, a set of applications that need to be updated, where each application from the set of applications is associated with a respective pending update; apply a machine learning model to determine a respective update priority score for each application from the set of applications; send, to the computing device, an indication of the respective update priority scores for the set of applications; receive, from the computing device, an update request for at least one application from the set of applications, the at least one application from the set of applications being selected by the computing device based on the respective update priority scores; and responsive to receiving the update request, initiate installation of the pending update for the at least one application from the set of applications.

Example 11: The computing system of example 10, wherein the computing device is a first computing device, wherein the machine learning model is a first machine learning model, and wherein the update priority score is a first update priority score, wherein the one or more processors are further configured to: determine an effectiveness of the first machine learning model based on a set of application updates installed on the first computing device that were prioritized based on the respective first update priority score for each application generated by the first machine learning model; determine an effectiveness of a second machine learning model based on a set of application updates installed on a second computing device that were prioritized based on a respective second update priority score for each application generated by the second machine learning model; and select, based on the effectiveness of the first machine learning model and the effectiveness of the second machine learning model, a more effective one of the first and second machine learning models to use for prioritizing future application updates as a preferred machine learning model.

Example 12: The computing system of example 11, wherein the one or more processors are further configured to, after selecting the preferred machine learning model: receive a subsequent request for application update information for the one or more applications installed on the first computing device; determine, based on the subsequent request for the application update information, a subsequent set of applications that need to be updated, where each application from the subsequent set of applications is associated with a respective subsequent pending update; apply the preferred machine learning model to determine a respective subsequent update priority score for each application from the subsequent set of applications; send, to the first computing device, an indication of the respective subsequent update priority scores for the subsequent set of applications; receive, from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiate installation of the subsequent pending update for the at least one application from the subsequent set of applications.

Example 13: The computing system of example 11 or 12, wherein the one or more processors are configured to determine the effectiveness of the first machine learning model further based on one or more of an application freshness metric, an application freshness for active users metric, an application update coverage metric, and an application update efficiency metric.

Example 14: The computing system of any of examples 10 through 13, wherein the machine learning model determines the respective update priority score for each application from the set of applications based at least in part on one or more of: one or more of an available memory of the computing device, a usage history for each application from the set of applications, a network preference for installing updates, an amount of time since a prior update for the at least one application from the set of applications was last installed, a respective likelihood of a successful installation of the update for each application, and an amount of time since a prior update for each of the at least one application was last installed.

Example 15: The computing system of any of examples 10 through 14, wherein the machine learning model determines the respective update priority score for each application by multiplying a probability of the pending update for the application being installed by a probability of application being opened within a pre-determined time period.

Example 16: The computing system of example 15, wherein the machine learning model determines the respective update priority score for each application by further applying a smoothing function.

Example 17: The computing system of any of examples 10 through 16, wherein the machine learning model determines the respective update priority score for each application independently.

Example 18: The computing system of any of examples 10 through 17, wherein the machine learning model determines the respective update priority score for a first application relative to a second application.

Example 19: A non-transitory computer-readable storage medium encoded with instructions that, when executed by one or more processors of a computing system, cause the one or more processors to: receive, from a computing device, a request for application update information for one or more applications installed on the computing device; determine, based on the request for the application update information, a set of applications that need to be updated, where each application from the set of applications is associated with a respective pending update; apply a machine learning model to determine a respective update priority score for each application from the set of applications; send, to the computing device, an indication of the respective update priority scores for the set of applications; receive, from the computing device, an update request for at least one application from the set of applications, the at least one application from the set of applications being selected by the computing device based on the respective update priority scores; and responsive to receiving the update request, initiate installation of the pending update for the at least one application from the set of applications.

Example 20: The non-transitory computer-readable storage medium of example 19, wherein the computing device is a first computing device, wherein the machine learning model is a first machine learning model, and wherein the update priority score is a first update priority score, wherein the instructions further cause the one or more processors to: determine an effectiveness of the first machine learning model based on a set of application updates installed on the first computing device that were prioritized based on the respective first update priority score for each application generated by the first machine learning model; determine an effectiveness of a second machine learning model based on a set of application updates installed on a second computing device that were prioritized based on a respective second update priority score for each application generated by the second machine learning model; and select, based on the effectiveness of the first machine learning model and the effectiveness of the second machine learning model, a more effective one of the first and second machine learning models to use for prioritizing future application updates as a preferred machine learning model.

Example 21: The non-transitory computer-readable storage medium of example 20, wherein the instructions further cause the one or more processors to, after selecting the preferred machine learning model: receive a subsequent request for application update information for the one or more applications installed on the first computing device; determine, based on the subsequent request for the application update information, a subsequent set of applications that need to be updated, where each application from the subsequent set of applications is associated with a respective subsequent pending update; apply the preferred machine learning model to determine a respective subsequent update priority score for each application from the subsequent set of applications; send, to the first computing device, an indication of the respective subsequent update priority scores for the subsequent set of applications; receive, from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiate installation of the subsequent pending update for the at least one application from the subsequent set of applications.

Example 22: The computing system of example 20 or 21, wherein the instructions further cause the one or more processors to determine the effectiveness of the first machine learning model further based on one or more of an application freshness metric, an application freshness for active users metric, an application update coverage metric, and an application update efficiency metric.

Example 23: The non-transitory computer-readable storage medium of any of examples 19 through 22, wherein the instructions cause the one or more processors to apply the machine learning model to determine the respective update priority score for each application from the set of applications based at least in part on one or more of: one or more of an available memory of the computing device, a usage history for each application from the set of applications, a network preference for installing updates, an amount of time since a prior update for the at least one application from the set of applications was last installed, a respective likelihood of a successful installation of the update for each application, and an amount of time since a prior update for each of the at least one application was last installed.

Example 24: The non-transitory computer-readable storage medium of any of examples 19 through, wherein the instructions cause the one or more processors to apply the machine learning model to determine the respective update priority score for each application by at least multiplying a probability of the pending update for the application being installed by a probability of application being opened within a pre-determined time period.

Example 25: A computing system including means for performing any combination of the methods of examples 1-9.

Example 26: A method includes sending, by a computing device and to a computing system, a request for application update information for one or more applications installed on the computing device; receiving, by the computing device and from the computing system, an indication of a respective update priority score for each application from a set of applications having a corresponding pending update, wherein each respective update priority score is determined by the computing system by at least applying a machine learned model to each application of the set of applications having the corresponding pending update; selecting, by the computing device and based on the respective update priority scores, at least one corresponding pending update to request from the computing system; sending, by the computing device and to the computing system, an update request for the at least one corresponding pending update; and responsive to receiving, by the computing device and from the computing system, the at least one corresponding pending update, installing, by the computing device, the at least one corresponding pending update.

Example 27: The method of example 26, wherein the request for application update information includes one or more of an information identifying the computing device, a configuration information pertaining to the computing device, a name of each application installed on the computing device, a version information for each application, or a network preference for each application.

Example 28: The method of example 26 or 27, further includes outputting, by the computing device, a graphical user interface that includes an indication of one or more applications from the set of one or more applications having a corresponding pending update and the respective update priority score for each of the one or more applications.

Example 29: The method of example 28, further includes receiving, by the computing device, a selection of an application from the one or more applications included in the graphical user interface as a selected application, wherein selecting the at least one corresponding pending update includes selecting the corresponding pending update associated with the selected application.

Example 30 The method of any of examples 26 through 29, wherein selecting the at least one corresponding pending update includes: determining a greatest update priority ranking from the respective update priority rankings; and selecting the corresponding pending update for the application associated with the greatest update priority ranking as the at least one corresponding pending update to request from the computing system:

Example 28: A device including means for performing any combination of the method of examples 26-30.

Example 29: A computer-readable storage medium encoded with instructions that, when executed by one or more processors of a computing system cause the one or more processors to perform any combination of the methods of examples 26-30.

Example 30: A method includes determining, by a computing system, an effectiveness of a first machine learning model based on a set of application updates installed on a first computing device that were prioritized based on a respective first update priority score for each application generated by the first machine learning model; determining, by the computing system, an effectiveness of a second machine learning model based on a set of application updates installed on a second computing device that were prioritized based on a respective second update priority score for each application generated by the second machine learning model; and selecting, by the computing system and based on the effectiveness of the first machine learning model and the effectiveness of the second machine learning model, a more effective one of the first and second machine learning models to use for prioritizing future application updates as a preferred machine learning model.

Example 31: The method of example 30, further includes receiving, by the computing system, a subsequent request for application update information for the one or more applications installed on the first computing device; determining, by the computing system and based on the subsequent request for the application update information, a subsequent set of applications that need to be updated, where each application from the subsequent set of applications is associated with a respective subsequent pending update; applying, by the computing system, the preferred machine learning model to determine a respective subsequent update priority score for each application from the subsequent set of applications; sending, from the computing system and to the first computing device, an indication of the respective subsequent update priority scores for the subsequent set of applications; receiving, by the computing system and from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiating, by the computing system, installation of the subsequent pending update for the at least one application from the subsequent set of applications.

Example 32: The method of example 31, wherein determining the effectiveness of the first machine learning model is further based on one or more of an application freshness metric, an application freshness for active users metric, an application update coverage metric, and an application update efficiency metric.

Example 33: The method of example 32, wherein the application freshness metric represents a set of computing devices included in an installation base of an application where users of the set of computing devices have installed the application for a first time within a pre-determined time period.

Example 34: The method of example 32 or 33, wherein the application freshness for active users metric represents a set of computing devices included in an installation base of an application where users of the set of computing devices have installed the application for a first time within a first pre-determined time period and have used the application within a second pre-determined time period.

Example 35: The method of any of example 32 through 34, wherein the application update coverage metric represents a set of computing devices included in an installation base of an application where users of the set of computing devices have not installed a most recent update for the application within a first pre-determined time period and have used the application within a second pre-determined time period.

Example 36: The method of any of examples 32 through 35, wherein the application update efficiency metric represents a set of computing devices included in an installation base of an application where users of the set of computing devices have not installed a most recent update for the application within a first pre-determined time period and have used the application after installing the update for the application within a second pre-determined time period.

Example 37: A computing device includes a memory that stores one or more modules; and one or more processors that execute the one or more modules to: determine an effectiveness of a first machine learning model based on a set of application updates installed on a first computing device that were prioritized based on a respective first update priority score for each application generated by the first machine learning model; determine an effectiveness of a second machine learning model based on a set of application updates installed on a second computing device that were prioritized based on a respective second update priority score for each application generated by the second machine learning model; and select, based on the effectiveness of the first machine learning model and the effectiveness of the second machine learning model, a more effective one of the first and second machine learning models to use for prioritizing future application updates as a preferred machine learning model.

Example 38: The computing device of example 37, wherein the one or more processors are further configured to, after selecting the preferred machine learning model, execute the one or more modules to: receive a subsequent request for application update information for the one or more applications installed on the first computing device; determine, based on the subsequent request for the application update information, a subsequent set of applications that need to be updated, where each application from the subsequent set of applications is associated with a respective subsequent pending update; apply the preferred machine learning model to determine a respective subsequent update priority score for each application from the subsequent set of applications; send, to the first computing device, an indication of the respective subsequent update priority scores for the subsequent set of applications; receive, from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiate installation of the subsequent pending update for the at least one application from the subsequent set of applications.

Example 39: The computing device of example 38, wherein the one or more processors execute the one or more modules to determine the effectiveness of the first machine learning model further based on one or more of an application freshness metric, an application freshness for active users metric, an application update coverage metric, and an application update efficiency metric.

Example 40: The computing device of example 39, wherein the application freshness metric represents a set of computing devices included in an installation base of an application where users of the set of computing devices have installed the application for a first time within a pre-determined time period.

Example 41: The computing device of example 39 or 40, wherein the application freshness for active users metric represents a set of computing devices included in an installation base of an application where users of the set of computing devices have installed the application for a first time within a first pre-determined time period and have used the application within a second pre-determined time period.

Example 42: The computing device of any of examples 39 through 41, wherein the application update coverage metric represents a set of computing devices included in an installation base of an application where users of the set of computing devices have not installed a most recent update for the application within a first pre-determined time period and have used the application within a second pre-determined time period.

Example 43: The computing device of any of examples 39 through 42, wherein the application update efficiency metric represents a set of computing devices included in an installation base of an application where users of the set of computing devices have not installed a most recent update for the application within a first pre-determined time period and have used the application after installing the update for the application within a second pre-determined time period.

Example 44: A non-transitory computer-readable storage medium encoded with instructions that, when executed by one or more processors of a computing system, cause the one or more processors to: determine an effectiveness of a first machine learning model based on a set of application updates installed on a first computing device that were prioritized based on a respective first update priority score for each application generated by the first machine learning model; determine an effectiveness of a second machine learning model based on a set of application updates installed on a second computing device that were prioritized based on a respective second update priority score for each application generated by the second machine learning model; and select, based on the effectiveness of the first machine learning model and the effectiveness of the second machine learning model, a more effective one of the first and second machine learning models to use for prioritizing future application updates as a preferred machine learning model.

Example 45: The non-transitory computer-readable storage medium of example 44, wherein the one or more processors further execute the instructions to, after selecting the preferred machine learning model: receive a subsequent request for application update information for the one or more applications installed on the first computing device; determine, based on the subsequent request for the application update information, a subsequent set of applications that need to be updated, where each application from the subsequent set of applications is associated with a respective subsequent pending update; apply the preferred machine learning model to determine a respective subsequent update priority score for each application from the subsequent set of applications; send, to the first computing device, an indication of the respective subsequent update priority scores for the subsequent set of applications; receive, from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiate installation of the subsequent pending update for the at least one application from the subsequent set of applications.

Example 46: The non-transitory computer-readable storage medium of example 45, wherein the one or more processors execute the one or more modules to determine the effectiveness of the first machine learning model further based on one or more of an application freshness metric, an application freshness for active users metric, an application update coverage metric, and an application update efficiency metric.

Example 47: The non-transitory computer-readable storage medium of example 46, wherein the application freshness metric represents a set of computing devices included in an installation base of an application where users of the set of computing devices have installed the application for a first time within a pre-determined time period.

Example 48: The non-transitory computer-readable storage medium of example 46 or 47, wherein the application freshness for active users metric represents a set of computing devices included in an installation base of an application where users of the set of computing devices have installed the application for a first time within a first pre-determined time period and have used the application within a second pre-determined time period.

Example 49: The non-transitory computer-readable storage medium of any of examples 46 through 48, wherein the application update coverage metric represents a set of computing devices included in an installation base of an application where users of the set of computing devices have not installed a most recent update for the application within a first pre-determined time period and have used the application within a second pre-determined time period.

Example 50: The non-transitory computer-readable storage medium of any of examples 46 through 49, wherein the application update efficiency metric represents a set of computing devices included in an installation base of an application where users of the set of computing devices have not installed a most recent update for the application within a first pre-determined time period and have used the application after installing the update for the application within a second pre-determined time period.

Example 51: A computing system including means for performing any combination of the methods of examples 30-36.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

receiving, by a computing system and from a computing device, a request for application update information for one or more applications installed on the computing device;

determining, by the computing system and based on the request for the application update information, a set of applications that need to be updated, where each application from the set of applications is associated with a respective pending update;

applying, by the computing system, a machine learning model to determine a respective update priority score for each application from the set of applications;

sending, from the computing system and to the computing device, an indication of the respective update priority scores for the set of applications;

receiving, by the computing system and from the computing device, an update request for at least one application from the set of applications, the at least one application from the set of applications being selected by the computing device based on the respective update priority scores; and responsive to receiving the update request, initiating, by the computing system, installation of the pending update for the at least one application from the set of applications.

2. The method of claim 1, wherein the computing device is a first computing device, wherein the machine learning model is a first machine learning model, and wherein the update priority score is a first update priority score, the method further comprising:

determining, by the computing system, an effectiveness of the first machine learning model based on a set of application updates installed on the first computing device that were prioritized based on the respective first update priority score for each application generated by the first machine learning model;

determining, by the computing system, an effectiveness of a second machine learning model based on a set of application updates installed on a second computing device that were prioritized based on a respective second update priority score for each application generated by the second machine learning model; and selecting, by the computing system and based on the effectiveness of the first machine learning model and the effectiveness of the second machine learning model, a more effective one of the first and second machine learning models to use for prioritizing future application updates as a preferred machine learning model.

3. The method of claim 2, further comprising, after selecting the preferred machine learning model:

receiving, by the computing system, a subsequent request for application update information for the one or more applications installed on the first computing device;

determining, by the computing system and based on the subsequent request for the application update information, a subsequent set of applications that need to be updated, where each application from the subsequent set of applications is associated with a respective subsequent pending update;

applying, by the computing system, the preferred machine learning model to determine a respective subsequent update priority score for each application from the subsequent set of applications;

sending, from the computing system and to the first computing device, an indication of the respective subsequent update priority scores for the subsequent set of applications;

receiving, by the computing system and from the first computing device, a subsequent update request for at least one application from the subsequent set of applications, the at least one application from the subsequent set of applications being selected by the first computing device based at least in part on the respective subsequent update priority scores; and responsive to receiving the subsequent update request, initiating, by the computing system, installation of the subsequent pending update for the at least one application from the subsequent set of applications.

4. The method of claim 2, wherein determining the effectiveness of the first machine learning model is further based on one or more of an application freshness metric, an application freshness for active users metric, an application update coverage metric, and an application update efficiency metric.

5. The method of claim 1, wherein the machine learning model determines the respective update priority score for each application from the set of applications based at least in part on one or more of:

one or more of an available memory of the computing device, a usage history for each application from the set of applications, a network preference for installing updates, an amount of time since a prior update for the at least one application from the set of applications was last installed, a respective likelihood of a successful installation of the update for each application, and an amount of time since a prior update for each of the at least one application was last installed.

6. The method of claim 1, wherein the machine learning model determines the respective update priority score for each application by multiplying a probability of the pending update for the application being installed by a probability of application being opened within a pre-determined time period.

7. A method comprising:

sending, by a computing device and to a computing system, a request for application update information for one or more applications installed on the computing device;

receiving, by the computing device and from the computing system, an indication of a respective update priority score for each application from a set of applications having a corresponding pending update, wherein each respective update priority score is determined by the computing system by at least applying a machine learning model to each application of the set of applications having the corresponding pending update;

selecting, by the computing device and based on the respective update priority scores, at least one corresponding pending update to request from the computing system;

sending, by the computing device and to the computing system, an update request for the at least one corresponding pending update; and responsive to receiving, by the computing device and from the computing system, the at least one corresponding pending update, installing, by the computing device, the at least one corresponding pending update.

8. The method of claim 7, wherein the request for application update information includes one or more of an information identifying the computing device, a configuration information pertaining to the computing device, a name of each application installed on the computing device, a version information for each application, or a network preference for each application.

9. The method of claim 7, further comprising:

outputting, by the computing device, a graphical user interface that includes an indication of one or more applications from the set of one or more applications having a corresponding pending update and the respective update priority score for each of the one or more applications.

10. The method of claim 9, further comprising:

receiving, by the computing device, a selection of an application from the one or more applications included in the graphical user interface as a selected application, wherein selecting the at least one corresponding pending update includes selecting the corresponding pending update associated with the selected application.

11. The method of claim 7, wherein selecting the at least one corresponding pending update comprises:

determining a greatest update priority ranking from the respective update priority scores; and selecting the corresponding pending update for the application associated with the greatest update priority ranking as the at least one corresponding pending update to request from the computing system.

* * * * *